(12) United States Patent
Kakutani

(10) Patent No.: US 10,873,469 B2
(45) Date of Patent: Dec. 22, 2020

(54) INFORMATION PROCESSING APPARATUS AND METHOD FOR CONTROLLING INFORMATION PROCESSING APPARATUS

(71) Applicant: CANON KABUSHIKI KAISHA, Tokyo (JP)

(72) Inventor: Naoya Kakutani, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/446,244

(22) Filed: Jun. 19, 2019

(65) Prior Publication Data

US 2019/0394051 A1    Dec. 26, 2019

(30) Foreign Application Priority Data

Jun. 25, 2018 (JP) ................................. 2018-119861

(51) Int. Cl.
   *H04L 9/32* (2006.01)
   *H04N 1/00* (2006.01)
   *H04N 1/327* (2006.01)

(52) U.S. Cl.
   CPC ......... *H04L 9/3268* (2013.01); *H04N 1/0097* (2013.01); *H04N 1/00464* (2013.01); *H04N 1/32771* (2013.01); *H04N 2201/0094* (2013.01)

(58) Field of Classification Search
   None
   See application file for complete search history.

(56) References Cited

U.S. PATENT DOCUMENTS

| | | | |
|---|---|---|---|
| 9,357,032 B2* | 5/2016 | Ikeda | H04L 63/08 |
| 2003/0018654 A1* | 1/2003 | Miwa | G05B 23/0272 |
| 2010/0131757 A1* | 5/2010 | Orrell | H04L 63/10 |
| | | | 713/162 |
| 2017/0155626 A1* | 6/2017 | Li | H04L 63/0428 |

FOREIGN PATENT DOCUMENTS

JP    2016178458 A    10/2016

* cited by examiner

*Primary Examiner* — Frantz Bataille
(74) *Attorney, Agent, or Firm* — Canon U.S.A., Inc. I.P. Division

(57) ABSTRACT

The present invention provides an information processing apparatus including: a destination setting unit configured to set a destination of an issuance request for an electronic certificate of a public key; a transmitting unit configured to transmit the issuance request to the destination at a time specified by a user; and an acquiring unit configured to acquire, from an external apparatus that is the destination, the electronic certificate that is issued on the basis of the issuance request transmitted to the destination. The information processing apparatus further includes a display control unit configured to display a setting screen on a display unit, the setting screen being a screen for receiving a setting of the destination. The display control unit prevents the setting screen from being displayed while the setting for transmitting the issuance request at the time specified by the user is in an enable state.

20 Claims, 20 Drawing Sheets

FIG. 4A

| NAME | USAGE | ISSUER | EXPIRATION START DATE | EXPIRATION END DATE | DESTINATION | ALGORITHM | KEY LENGTH | SERIAL NUMBER | THUMBPRINT |
|---|---|---|---|---|---|---|---|---|---|
| Cert1 | TLS | CN=CA01, C=JP | 2019/1/1 | 2020/1/1 | CN=Device001, OU= Dev.A, O= CANON, C=JP | RSA | 1024 | 01 02 03 04 05 | 01 02 01 03 01 04 01 05 01 06 01 07 01 08 01 09 01 0A 01 0B |
| Cert2 | IPSEC | CN=CA01, C=JP | 2015/1/1 | 2036/1/1 | CN=Device001, OU= Dev.A, O= CANON, C=JP | RSA | 2048 | 01 02 03 04 06 | 02 02 02 03 02 04 02 05 02 06 02 07 02 08 02 09 02 0A 02 0B |
| Cert3 | IEEE802.1X | CN=CA01, C=JP | 2020/1/1 | 2025/1/1 | CN=Device001, OU= Dev.A, O= CANON, C=JP | RSA | 2048 | 01 02 03 04 07 | 03 02 03 03 03 04 03 05 03 06 03 07 03 08 03 09 03 0A 03 0B |

FIG. 4B

| NAME | USAGE | ISSUER | EXPIRATION START DATE | EXPIRATION END DATE | DESTINATION | ALGORITHM | KEY LENGTH | SERIAL NUMBER | THUMBPRINT |
|---|---|---|---|---|---|---|---|---|---|
| Cert1 | TLS | CN=CA01, C=JP | 2019/1/1 | 2020/1/1 | CN=Device001, OU=Dev.A, O=CANON, C=JP | RSA | 1024 | 01 02 03 04 05 | 01 02 01 03 01 04 01 05 01 06 01 07 01 08 01 09 01 0A 01 0B |
| Cert2 | IPSEC | CN=CA01, C=JP | 2015/1/1 | 2036/1/1 | CN=Device001, OU=Dev.A, O=CANON, C=JP | RSA | 2048 | 01 02 03 04 06 | 02 02 02 03 02 04 02 05 02 06 02 07 02 08 02 09 02 0A 02 0B |
| Cert3 | IEEE802.1X | CN=CA01, C=JP | 2020/1/1 | 2025/1/1 | CN=Device001, OU=Dev.A, O=CANON, C=JP | RSA | 2048 | 01 02 03 04 07 | 03 02 03 03 03 04 03 05 03 06 03 07 03 08 03 09 03 0A 03 0B |
| Cert4 | NONE | CN=CA01, C=JP | 2020/1/1 | 2025/1/1 | CN=Device001, OU=Dev.A, O=CANON, C=JP | RSA | 2048 | 01 02 03 04 08 | 04 02 03 04 04 04 04 05 04 06 04 07 04 08 04 09 04 0A 04 0B |

FIG. 4C

| NAME | USAGE | ISSUER | EXPIRATION START DATE | EXPIRATION END DATE | DESTINATION | ALGORITHM | KEY LENGTH | SERIAL NUMBER | THUMBPRINT |
|---|---|---|---|---|---|---|---|---|---|
| Cert1 | NONE | CN=CA01, C=JP | 2019/1/1 | 2020/1/1 | CN=Device001, OU=Dev.A, O=CANON, C=JP | RSA | 1024 | 01 02 03 04 05 | 01 02 01 03 01 04 01 05 01 06 01 07 01 08 01 09 01 0A 01 0B |
| Cert2 | IPSEC | CN=CA01, C=JP | 2015/1/1 | 2036/1/1 | CN=Device001, OU=Dev.A, O=CANON, C=JP | RSA | 2048 | 01 02 03 04 06 | 02 02 02 03 02 04 02 05 02 06 02 07 02 08 02 09 02 0A 02 0B |
| Cert3 | IEEE802.1X | CN=CA01, C=JP | 2020/1/1 | 2025/1/1 | CN=Device001, OU=Dev.A, O=CANON, C=JP | RSA | 2048 | 01 02 03 04 07 | 03 02 03 03 03 04 03 05 03 06 03 07 03 08 03 09 03 0A 03 0B |
| Cert4 | TLS | CN=CA01, C=JP | 2020/1/1 | 2025/1/1 | CN=Device001, OU=Dev.A, O=CANON, C=JP | RSA | 2048 | 01 02 03 04 08 | 04 02 04 03 04 04 04 05 04 06 04 07 04 08 04 09 04 0A 04 0B |

FIG. 5A

CERTIFICATE ACQUISITION REQUEST AND SETTING SCREEN

CERTIFICATE LIST 1001
CONNECTION SETTING 1002
CERTIFICATE ISSUANCE REQUEST 1004
RESERVATION SETTING 1005

CERTIFICATE LIST 1010

| NAME | USAGE | ISSUER | EXPIRATION END DATE | DETAILS |
|------|-------|--------|---------------------|---------|
| Cert1 | TLS | CA001 | 2020/1/1 | ☼ |
| Cert2 | IPSEC | CA001 | 2036/1/1 | ☼ |
| Cert3 | IEEE802.1X | CA001 | 2025/1/1 | ☼ |

CERTIFICATE ACQUISITION REQUEST AND SETTING SCREEN

- CERTIFICATE LIST  1001
- CONNECTION SETTING  1002
- CERTIFICATE ISSUANCE REQUEST  1004
- RESERVATION SETTING  1005

UPDATE  1806     CANCEL  1807

CERTIFICATE UPDATE RESERVATION SETTING

☐ SPECIFY UPDATING DATE  — 1801

ACQUISITION REQUEST START DATE  YEAR ☐  MONTH ☐  DAY ☐
ACQUISITION REQUEST START TIME  HOUR ☐  MINUTE ☐

☑ UPDATE IF EXPIRATION OF CERTIFICATE IS WITHIN PREDETERMINED PERIOD  — 1802
  [14] DAYS BEFORE EXPIRATION

☐ UPDATE EVERY PERIOD  — 1803
  ○ UPDATE EVERY [  ] DAYS
  ○ UPDATE ON DAY [  ] IN EACH MONTH
  ○ UPDATE ON MONTH [  ] DAY [  ] IN EACH YEAR

SETTINGS OF KEY AND CERTIFICATE AS TARGETS OF ISSUANCE REQUEST  — 1804

NAME: [          ]
KEY LENGTH    ○ 1024 bit   ○ 2048 bit   ○ 3072 bit   ○ 4096 bit
KEY USAGE     ☐ TLS   ☐ IPSEC   ☐ IEEE802.1X
ALGORITHM     ○ RSA   ○ ECDSA
SIGNATURE VERIFICATION?   ○ YES   ○ NO

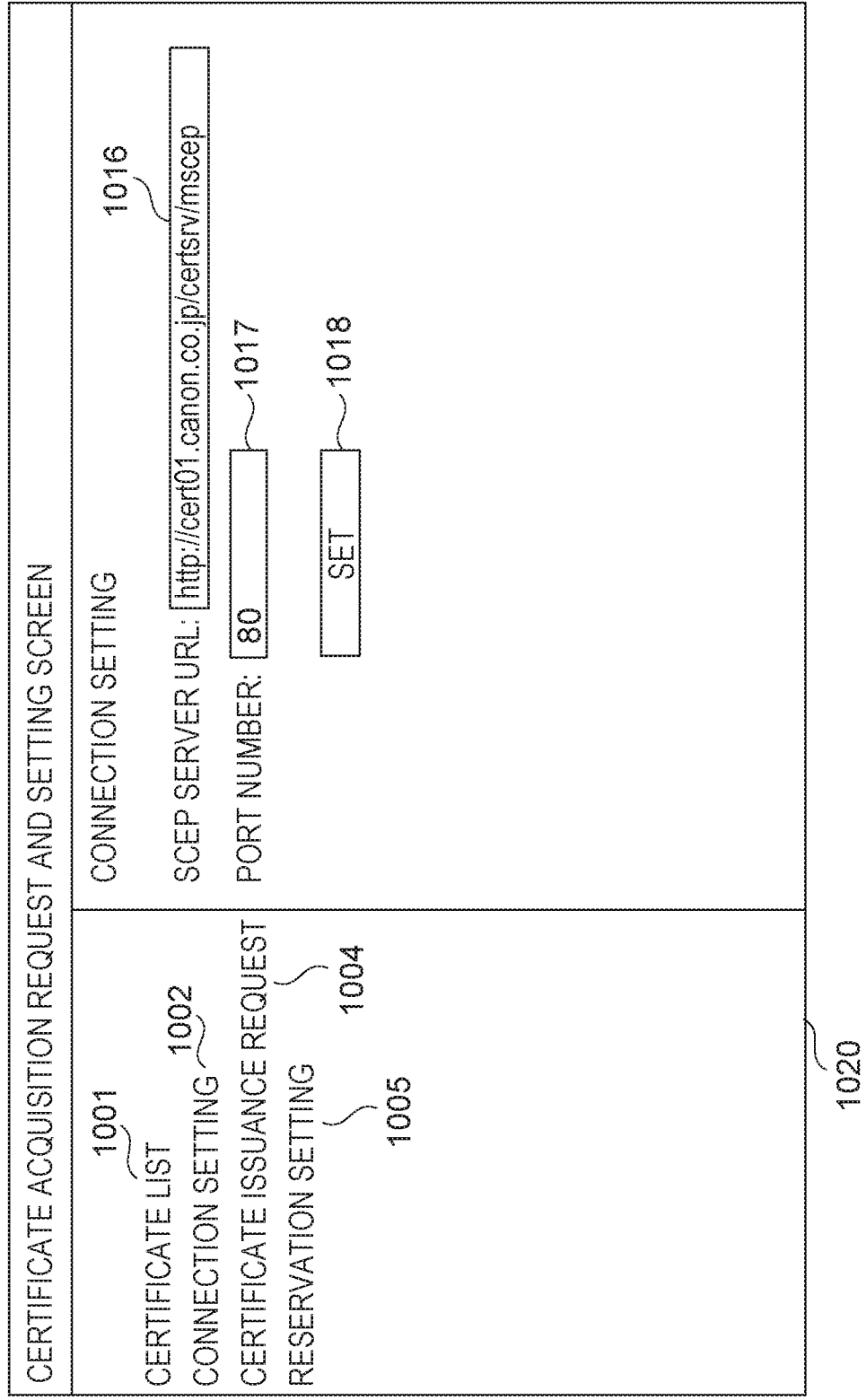

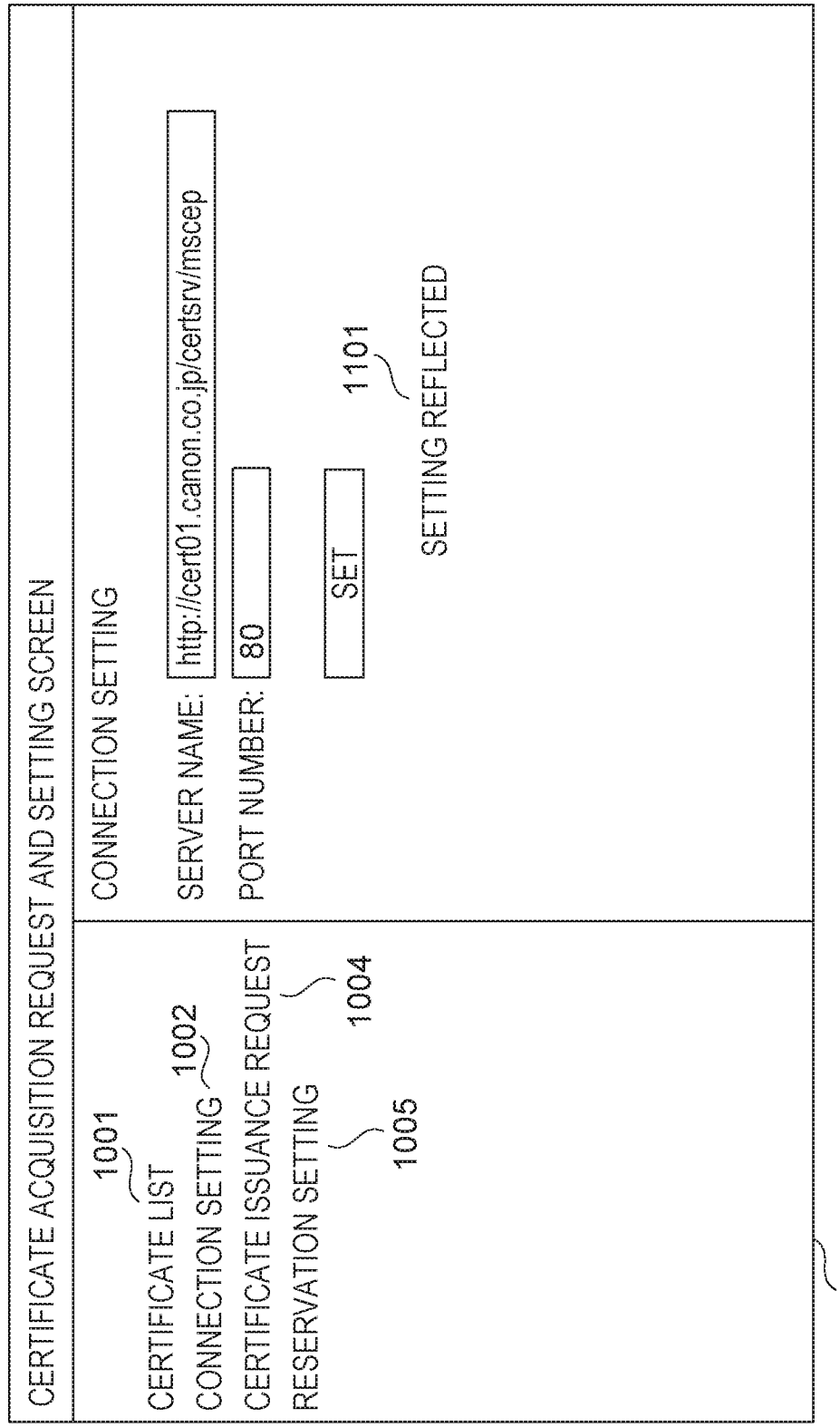

FIG. 7

CERTIFICATE ACQUISITION REQUEST AND SETTING SCREEN

CERTIFICATE LIST 1001
CONNECTION SETTING 1002
CERTIFICATE ISSUANCE REQUEST 1004
RESERVATION SETTING 1005

DETAILS OF CERTIFICATE INFORMATION

NAME: Cert1
USAGE: TLS
ISSUER: CN=CA01, C=JP
EXPIRATION START DATE: 2017/1/1
EXPIRATION END DATE: 2020/1/1
DESTINATION: CN=Device001, OU=Dev.A, O=CANON, C=JP
KEY ALGORITHM: RSA 2048 bit
SERIAL NUMBER: 01 02 03 04 05
THUMBPRINT OF CERTIFICATE (SHA1):
01 02 01 03 01 04 01 05 01 06 01 07 01 08 01 09 01 0A 01 0B

CERTIFICATE ACQUISITION REQUEST AND SETTING SCREEN

CERTIFICATE LIST ~1001
CONNECTION SETTING ~1002
CERTIFICATE ISSUANCE REQUEST ~1004
RESERVATION SETTING ~1005

TRANSMIT CERTIFICATE ISSUANCE REQUEST

NAME: [Cert4] ~1301
ALGORITHM ◉RSA ○ECDSA ~1302
KEY LENGTH ○1024 bit ◉2048 bit ○3072 bit ○4096 bit DESTINATION INFORMATION INPUT ~1303
NAME OF COUNTRY: [JP]
PREFECTURE: [ ]
CITY: [ ]
ORGANIZATION: [CANON]
ORGANIZATION UNIT: [DEV01]
COMMON NAME: [Device001]

SIGNATURE VERIFICATION? ◉YES ○NO ~1304
KEY USAGE ☑TLS ☐IPSEC ☐IEEE802.1X ~1305
PASSWORD: [ABCDEFG12345] ~1306

[EXECUTE] ~1307

1020

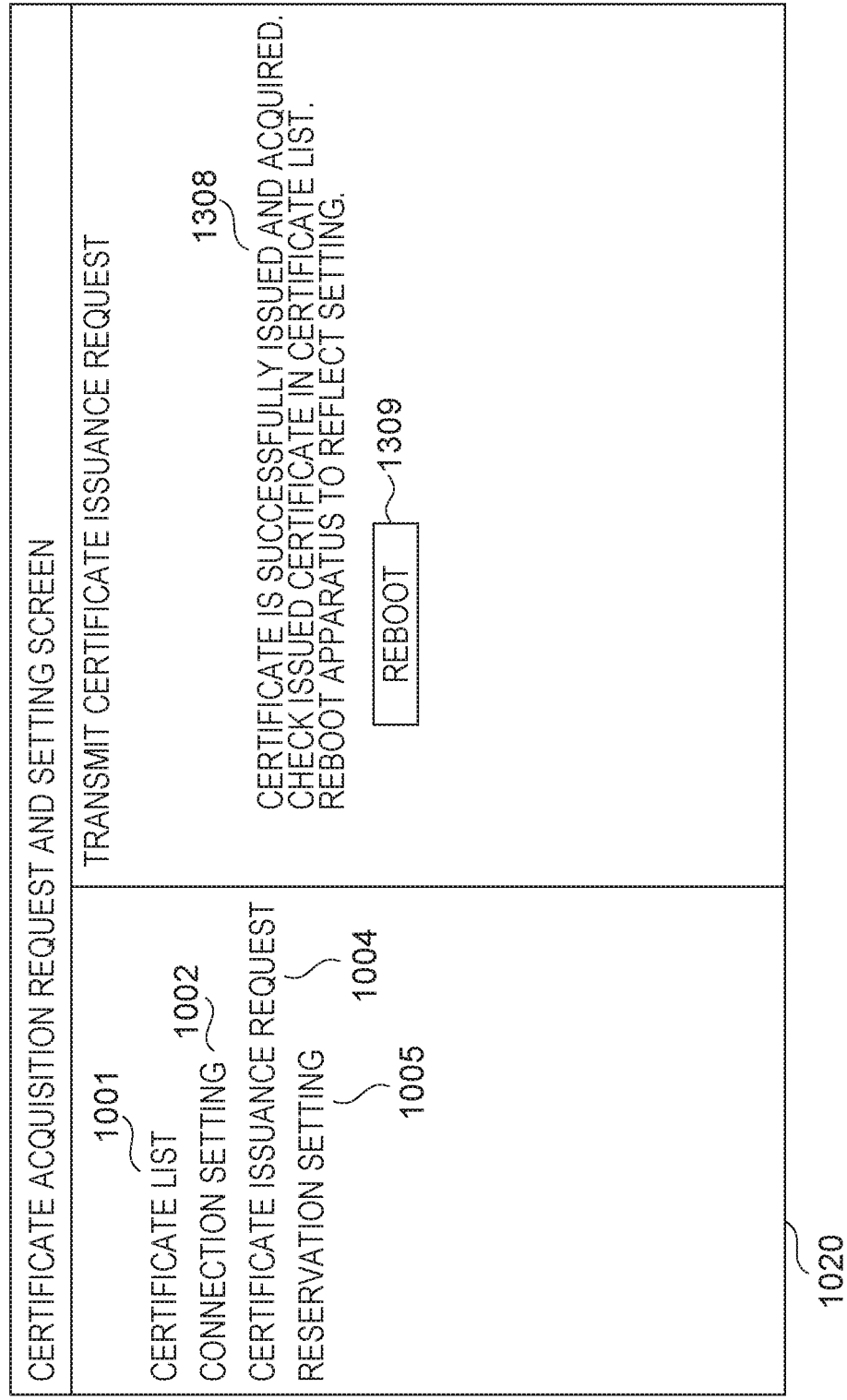

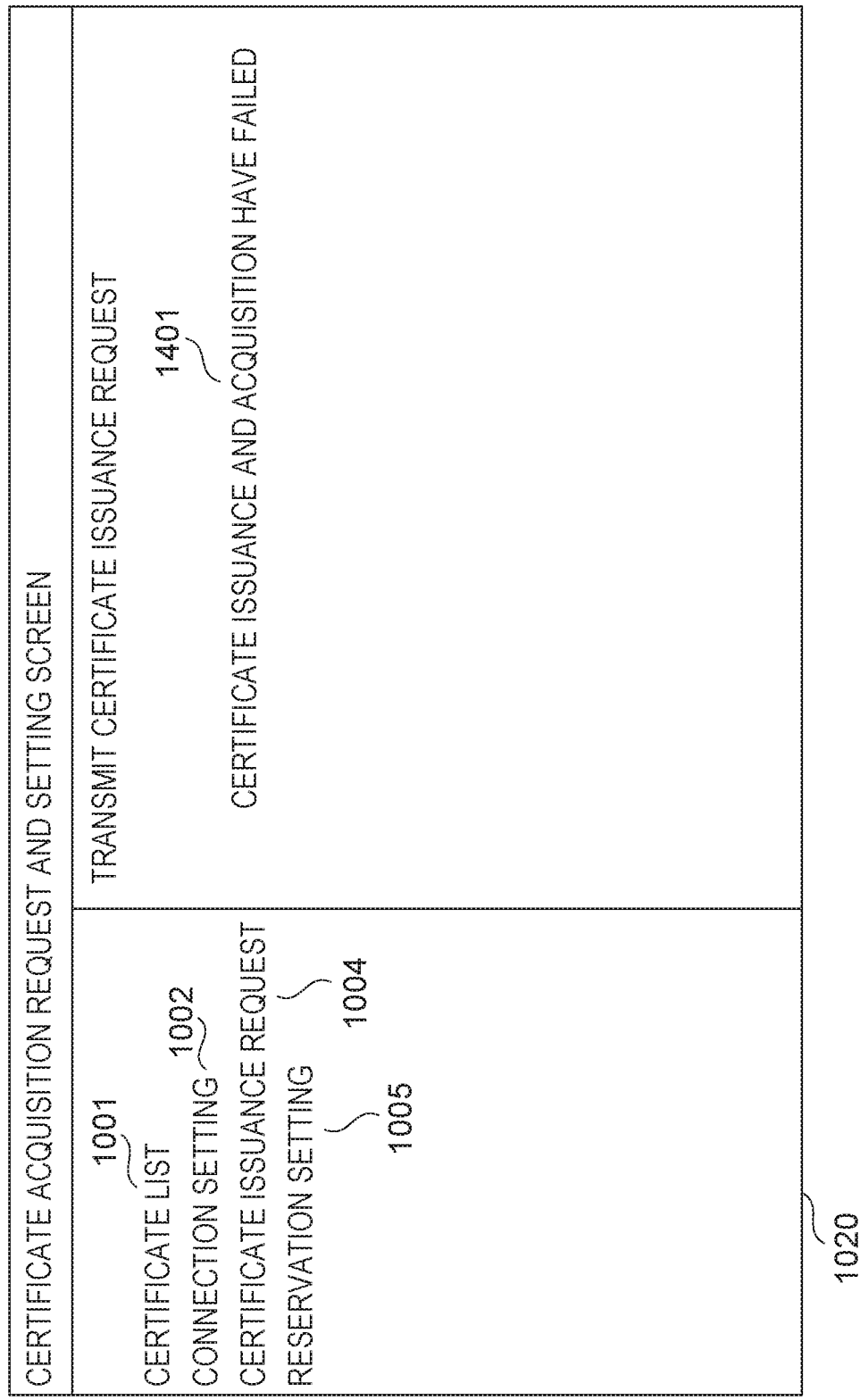

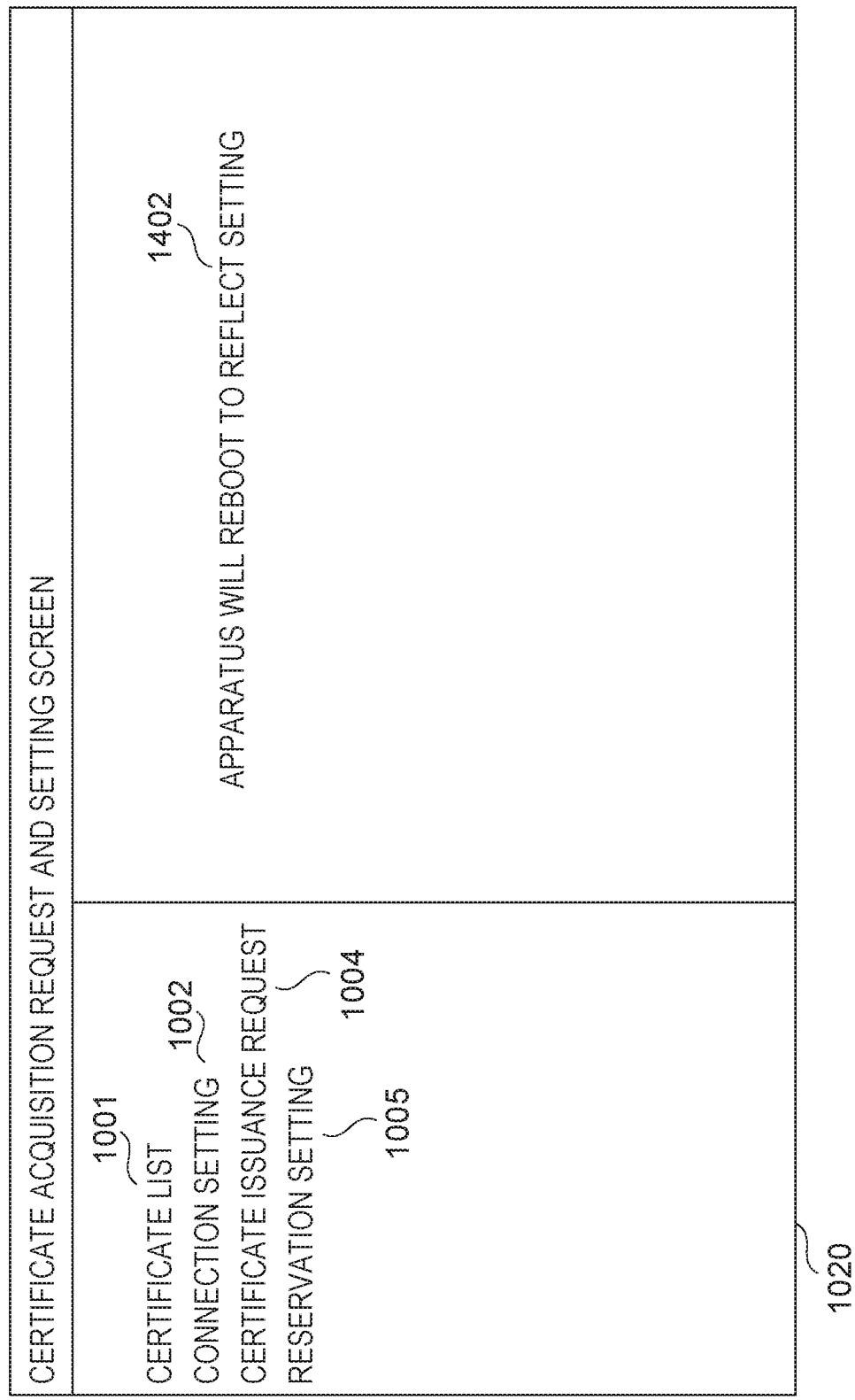

INFORMATION PROCESSING APPARATUS AND METHOD FOR CONTROLLING INFORMATION PROCESSING APPARATUS

BACKGROUND OF THE INVENTION

Field of the Invention

The present invention relates to an information processing apparatus and a method for controlling the information processing apparatus.

Description of the Related Art

A multifunction peripheral and an apparatus such as a personal computer (PC) are connected to, for example, an in-house network in some cases. In these cases, image data is transmitted from the PC to the multifunction peripheral to be stored in the multifunction peripheral, and the PC accesses the multifunction peripheral to acquire the image data stored in the multifunction peripheral.

To connect the multifunction peripheral to a secure network such as an in-house network, it is necessary to certify for a network server that the multifunction peripheral is a client device that is connectable to the in-house network. Accordingly, the multifunction peripheral acquires a certificate of a public key that is certified by a certificate authority through a registration authority that serves as a certificate management server. Thus, by using the certificate of the public key, the multifunction peripheral shows to the network server that the multifunction peripheral is a device that is connectable to the in-house network. If the network server determines that the certificate acquired from the multifunction peripheral is a valid certificate, the multifunction peripheral is allowed to be connected to the in-house network.

The certificate of the public key acquired by the multifunction peripheral has expiration. After the expiration, it is not possible to certify that the multifunction peripheral is a device that is connectable to the in-house network, and the multifunction peripheral is no longer allowed to be connected to the network.

Japanese Patent Laid-Open No. 2016-178458 describes an electronic device. On a date that is earlier than the expiration of an electronic certificate by a predetermined number of days, the electronic device transmits an issuance request for the electronic certificate to a certificate management server and automatically updates the electronic certificate.

SUMMARY OF THE INVENTION

The present invention provides an information processing apparatus including: a destination setting unit configured to set a destination of an issuance request for an electronic certificate of a public key; a transmitting unit configured to transmit the issuance request to the destination set by the destination setting unit at a time specified by a user; and an acquiring unit configured to acquire, from an external apparatus that is the destination, the electronic certificate that is issued on the basis of the issuance request transmitted to the destination. The information processing apparatus further includes a display control unit configured to display a setting screen on a display unit, the setting screen being a screen for receiving a setting of the destination. The display control unit prevents the setting screen from being displayed while the setting for transmitting the issuance request at the time specified by the user is in an enable state.

Further features and aspects of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIGS. 4A to 4C illustrate examples of key pair-certificate databases according to this embodiment.

FIGS. 5A and 5B illustrate examples of screens displayed on a PC in order to set information related to an electronic certificate according to this embodiment.

FIGS. 6A and 6B illustrate examples of connection setting screens displayed on the PC for transmitting an issuance request for the electronic certificate according to this embodiment.

FIG. 7 illustrates an example of a screen that is displayed on the PC and that indicates details of the electronic certificate to be stored in the information processing apparatus according to this embodiment.

FIGS. 9A and 9B illustrate examples of screens for giving an instruction related to transmission of the issuance request for the electronic certificate according to this embodiment.

FIGS. 10A and 10B illustrate examples of screens related to acquisition of the electronic certificate according to this embodiment.

DESCRIPTION OF THE EMBODIMENTS

Hereinafter, an exemplary embodiment of the present invention will be described in detail with reference to the attached drawings. It is to be noted that the following exemplary embodiment is not intended to limit the present invention according to the claims and that not all the combinations of the features described in the present exemplary embodiment are essential in the present invention. In the following description, an information processing apparatus according to the exemplary embodiment that uses and manages an electronic certificate (hereinafter also referred to as certificate) is a multifunction peripheral (digital multifunction peripheral, MFP) as an example. However, applications of the present invention are not limited to the multifunction peripheral, and the present invention may be applied to any information processing apparatus that can use an electronic certificate.

Figure 1:
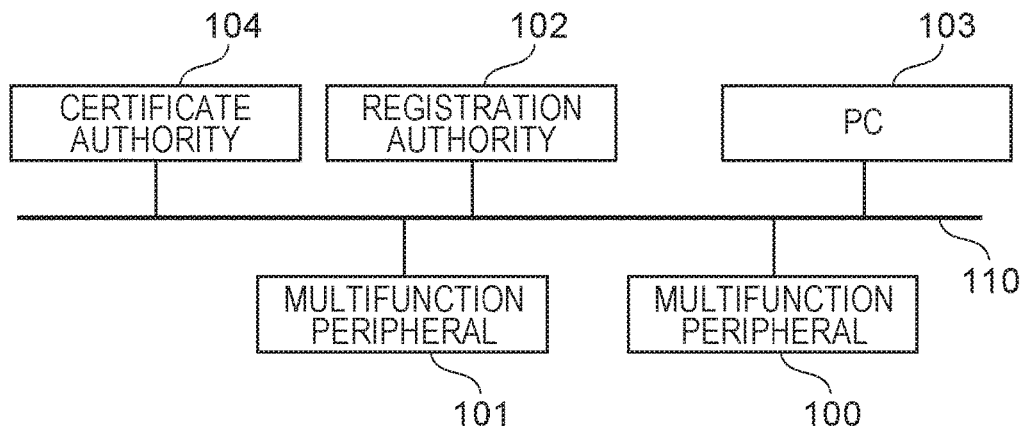
FIG. 1 illustrates an example of a network configuration according to an embodiment.

FIG. 1 illustrates a network configuration according to the embodiment of the present invention.

A multifunction peripheral 100 having a print function can transmit and receive print data, scanned image data, device management information, and the like to and from another information processing apparatus via a network 110. In addition, the multifunction peripheral 100 may perform encrypted communication, such as Transport Layer Security (TLS) communication, Security Architecture for Internet Protocol (IPsec) communication, and IEEE 802.1X communication. Ideally, the multifunction peripheral 100 also holds: pairs of public keys and private keys to be used for encryption processing for such types of communication; and electronic certificates of the public keys. The multifunction peripheral 100 herein is an example of the information processing apparatus, and the information processing apparatus is not limited to this. The information processing apparatus may be an apparatus having a function of a facsimile apparatus, a function of a printer, and a function of a copier, alone or in combination. Another multifunction peripheral 101 may also be connected to the network 110 and have the same or substantially the same functions as the other multifunction peripheral 100. Now, most of the following description refers to the multifunction peripheral 100. The multifunction peripheral 100 also has a function of a web server. The multifunction peripheral 100 provides a remote user interface (RUI) function for generating a screen in the form of a web page and provides the page to a PC 103. On the screen, information related to the multifunction peripheral 100 is set, and, for example, information related to an issuance request and acquisition of a certificate is set. Note that the network 110 in this embodiment is not limited to the Internet and may be a network used in a limited area, such as an in-house local area network (LAN). That is, the multifunction peripheral 100 and a registration authority 102 may be present in the same domain.

The registration authority 102 has the functions of a registration authority (RA) that receives the issuance request for the certificate and registers the certificate. That is, the registration authority 102 is a certificate management server having a function for distributing a certificate authority (CA) certificate via the network 110, receiving the issuance request for the certificate, and registering the certificate. In this embodiment, for issuing and acquiring the certificate, Simple Certificate Enrollment Protocol (SCEP) is used. By using SCEP, the information processing apparatus such as the multifunction peripheral 100 performs communication with the registration authority 102 via the network 110 to request issuance of the certificate and to acquire the certificate.

A certificate authority 104 has the functions of a certificate authority (CA) that issues the certificate on the basis of an instruction from the registration authority 102.

Upon reception of the issuance request for the certificate from the information processing apparatus via the network 110, the certificate authority 104 and the registration authority 102 issues and registers the certificate based on the issuance request, and transmit the issued certificate as a response to the issuance request. The functions of the certificate authority 104 and the registration authority 102 are realized by two server apparatuses in this embodiment. However, the certificate authority 104 and the registration authority 102 may be realized by a single server apparatus. In addition, SCEP is used as a protocol for requesting issuance of the certificate and acquiring the certificate in this embodiment. However, any other protocol having the same or substantially the same functions may be used. For example, Certificate Management Protocol (CMP), Enrollment over Secure Transport (EST) protocol, or the like may be used.

The PC 103 is a personal computer. The PC 103 is equipped with a web browser function and can analyze Hypertext Markup Language (HTML) data that is provided from the information processing apparatus connected to the network 110 and can display a screen on a display unit. In this embodiment, the PC 103 accesses the multifunction peripheral 100, and acquires and displays a web page on which a user sets information related to issuance of the certificate and information related to the certificate authority 104. On the screen displayed on the display unit of the PC 103, the user sets information related to issuance and acquisition of the certificate and information related to the certificate authority 104. This embodiment will describe an exemplary case where information of the registration authority 102 is set from the PC 103 by using the RUI function of the multifunction peripheral 100. The user may also set information related to issuance of the certificate and information related to the certificate authority 104 and the registration authority 102 by operating an operation panel of the multifunction peripheral 100.

Figure 2:
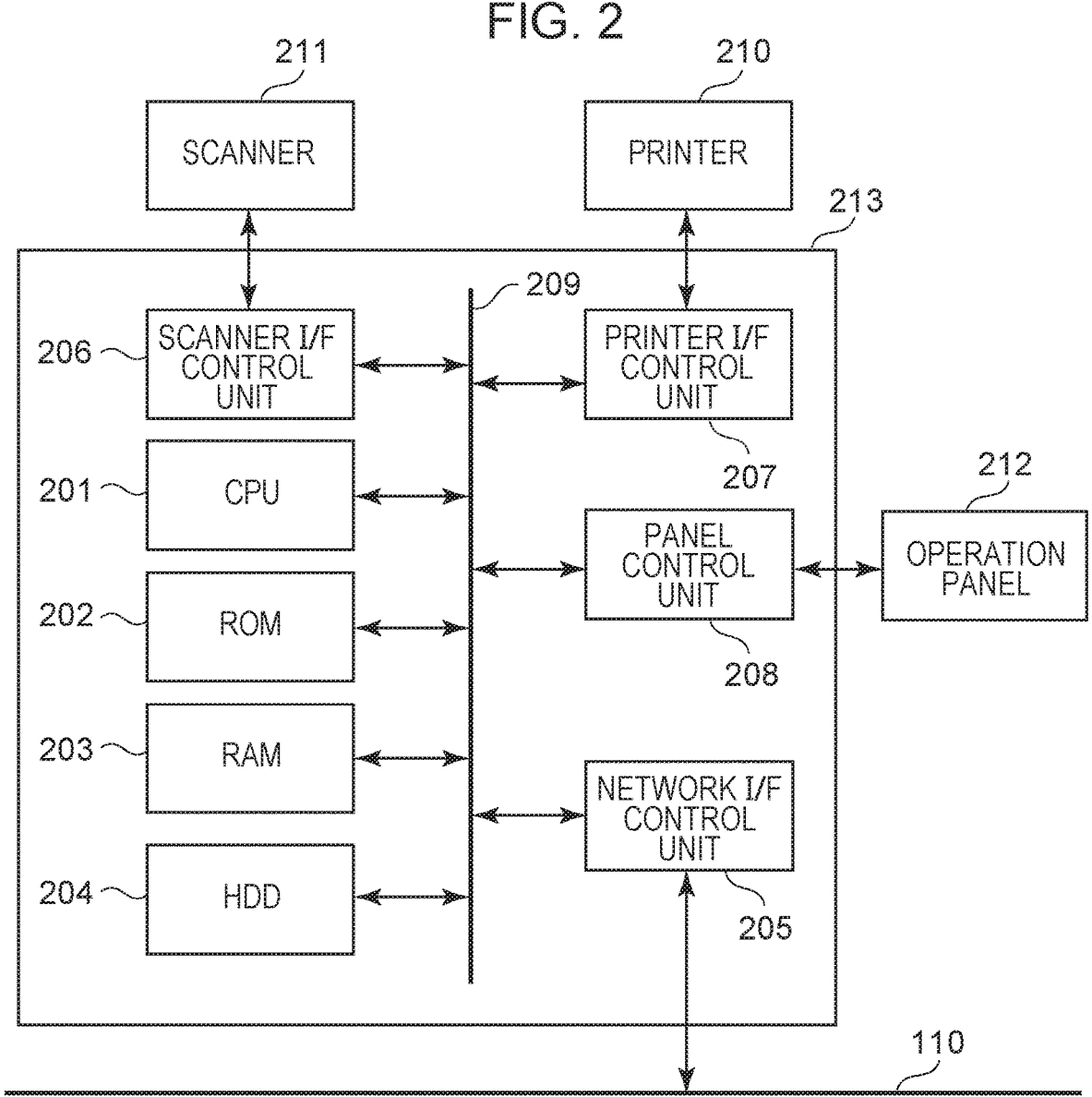
FIG. 2 illustrates an example of a hardware configuration of an information processing apparatus according to this embodiment.

FIG. 2 is a block diagram illustrating a hardware configuration of the multifunction peripheral 100 according to this embodiment.

A controller 213 is a controller in which the following respective modules are connected via a bus 209. A central processing unit (CPU) 201 executes software programs of the multifunction peripheral 100 and controls the entire apparatus. A read-only memory (ROM) 202 stores a boot program, fixed parameters, and the like of the multifunction peripheral 100. A random access memory (RAM) 203 is used for storing programs and temporarily storing data when the CPU 201 controls the multifunction peripheral 100. A hard disk drive (HDD) 204 stores system software, applications, and various kinds of data. The CPU 201 executes the boot program stored in the ROM 202, loads programs stored in the HDD 204 into the RAM 203, and executes the programs so as to control the operations of the multifunction peripheral 100. A network interface (I/F) control unit 205 controls transmission and reception of data via the network 110. A scanner interface (I/F) control unit 206 controls reading of a document by using a scanner 211. A printer interface (I/F) control unit 207 controls print processing of a printer 210 and the like. A panel control unit 208 controls an operation panel 212 that is a touch panel and controls display of various kinds of information and input of instructions from a user. The bus 209 connects the CPU 201, the ROM 202, the RAM 203, the HDD 204, the network I/F control unit 205, the scanner I/F control unit 206, the printer I/F control unit 207, and the panel control unit 208 to each other. Each hardware component transmits and receives a control signal from the CPU 201 and a data signal between apparatuses through the bus 209.

Figure 3:
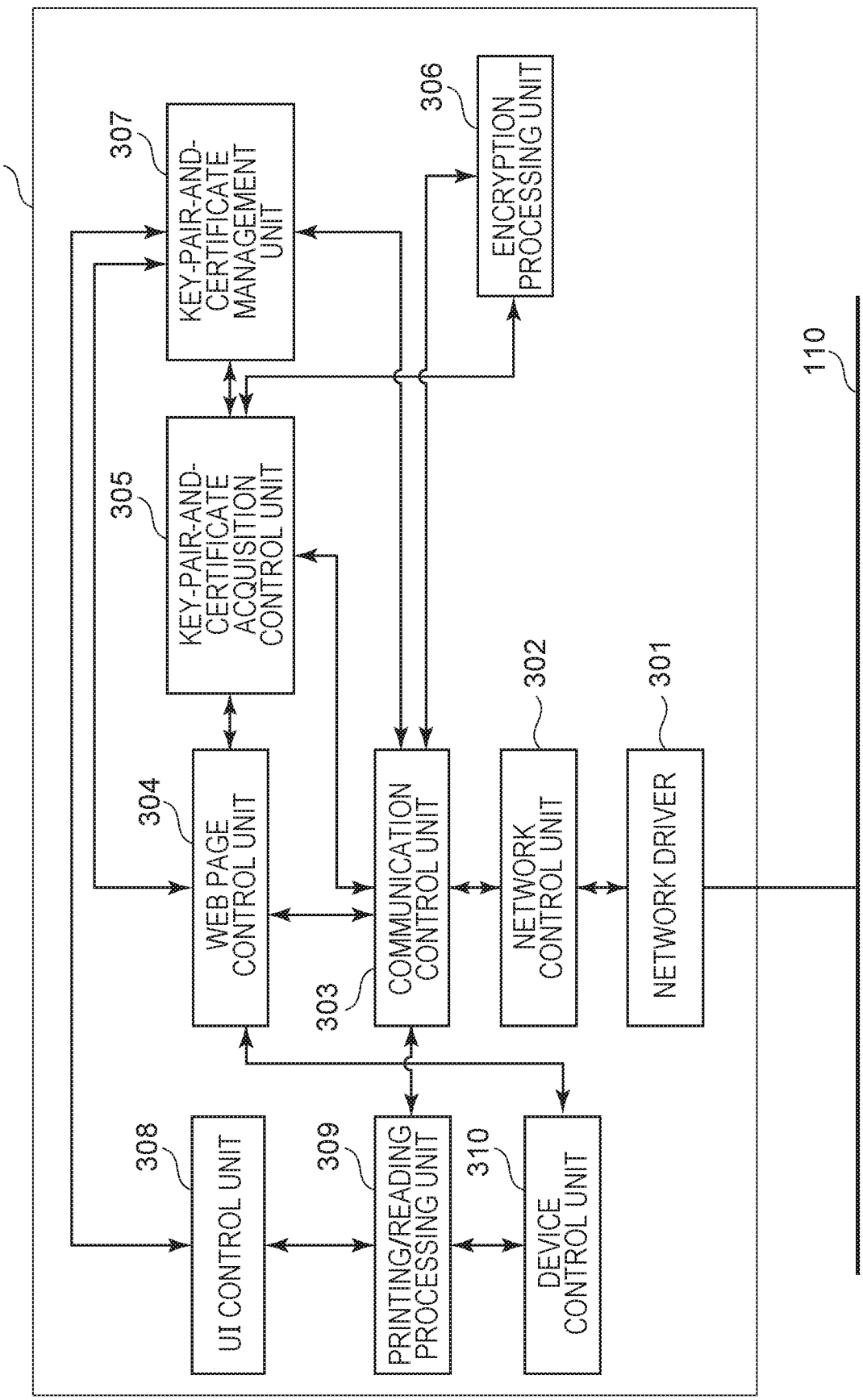
FIG. 3 illustrates an example of software modules of the information processing apparatus according to this embodiment.

FIG. 3 is a block diagram illustrating software modules of the multifunction peripheral 100 according to this embodiment. Note that each of the software modules illustrated in FIG. 3 is realized by the CPU 201 executing a program loaded into the RAM 203.

A network driver 301 controls the network I/F control unit 205 connected to the network 110 to transmit and receive data to and from an external apparatus via the network 110. A network control unit 302 controls communication in and under transport layer using a network communication protocol such as Transmission Control Protocol/Internet Protocol (TCP/IP) to transmit and receive data. A communication control unit 303 is a module for controlling a plurality of communication protocols supported by the multifunction peripheral 100. In acquiring and updating a certificate according to this embodiment, the communication control unit 303 controls a request for Hypertext Transfer Protocol (HTTP) communication, generation and analysis of response data, and transmission and reception of data, and controls communication with the registration authority 102 and the PC 103. The communication control unit 303 also controls encrypted communication, such as TLS communication, IPsec communication, and IEEE 802.1X communication, supported by the multifunction peripheral 100.

A web page control unit 304 is a module that generates HTML data and controls display of the HTML data. The HTML data is used for displaying a web page on which issuance of the certificate can be requested and the certificate can be acquired. The web page control unit 304 requests display of a web page transmitted from the network driver 301 through the communication control unit 303 and processing in response to the issuance request for the certificate and an instruction for acquiring the certificate. The web page control unit 304 transmits HTML data of a predetermined web page stored in the RAM 203 or the HDD 204, or HTML data generated in response to the content of the display request, as a response to the request from the web browser.

A key-pair-and-certificate acquisition control unit 305 is a module for acquiring the certificate. The key-pair-and-certificate acquisition control unit 305 is a module that controls SCEP communication, generates and analyzes encrypted data that is necessary for SCEP communication, such as Public Key Cryptography Standards (PKCS)#7 or PKCS #10, stores the acquired certificate, and sets setting usage thereof, for example.

An encryption processing unit 306 is a module for encrypting and decrypting data for performing various kinds of encryption processing including generation and verification of an electronic signature, generation of a hush value, and the like. The encryption processing unit 306 performs encryption processing that is necessary in generating and analyzing SCEP request and its response data in the acquisition and updating of the certificate according to this embodiment. Note that the encryption processing unit 306 performs encryption processing also in encrypted communication, such as TLS communication, IPsec communication, and IEEE 802.1X communication, performed by the communication control unit 303. At the time of the encryption processing, the encryption processing unit 306 acquires key pair data and certificate data from a key-pair-and-certificate management unit 307.

The key-pair-and-certificate management unit 307 is a module that manages key pairs and certificates held by the multifunction peripheral 100. The key-pair-and-certificate management unit 307 stores key pair data and certificate data in the RAM 203 or the HDD 204 together with various setting values. FIG. 4A schematically illustrates a database indicating detailed information of the key pairs and certificates managed by the key-pair-and-certificate management unit 307. The database illustrated in FIG. 4A stores, names, usages, and expiration start and end dates of the key pairs held by the multifunction peripheral 100.

A user interface (UI) control unit 308 controls the operation panel 212 and the panel control unit 208. A printing/reading processing unit 309 executes functions of printing by using the printer 210, reading of a document by using the scanner 211, and the like. In the following embodiment, the web page control unit 304 generates HTML data of a screen and transmits the data to the PC 103, so that the screen is displayed on an operation unit of the PC 103. In a case where the screen displayed in the following description is displayed on the operation panel 212 of the multifunction peripheral 100, the UI control unit 308 generates screen data, so that the screen is displayed on the operation panel 212. A device control unit 310 generates control commands or control data of the multifunction peripheral 100 and generally controls the multifunction peripheral 100. Note that the device control unit 310 according to this embodiment controls a power source of the multifunction peripheral 100 and reboots the multifunction peripheral 100 in response to an instruction from the web page control unit 304. For example, in a case where a user changes the setting of an acquisition request for the certificate from the PC 103 by using the RUI function, the web page control unit 304 instructs the device control unit 310 to reboot the multifunction peripheral 100 as necessary. In response to the instruction received from the web page control unit 304, the device control unit 310 reboots the multifunction peripheral 100.

The following description refers to how a user checks lists and details of public keys and certificates stored in the multifunction peripheral 100 in a system according to this embodiment. In this embodiment, the PC 103 accesses a single multifunction peripheral and acquires information of a certificate related to the multifunction peripheral. The PC 103 may also access a plurality of multifunction peripherals and may acquire and display information of certificates related to the plurality of multifunction peripherals.

FIG. 5A is an example of a screen displayed on the display unit of the PC 103 when the PC 103 accesses the multifunction peripheral 100 and information related to certificates is set. In this example, when a user sets information related to certificates, a key pair-certificate list screen is displayed.

A key pair-certificate list screen illustrated in FIG. 5A includes a name 1011 of each certificate, usage 1012, an issuer 1013, an expiration end date 1014, and a "details" button 1015. The name 1011 is a character string that is freely set by a user upon issuance of a key pair and a certificate. The usage 1012 is a setting value indicating that the usage of the key pair and the certificate is any one of TLS, IPsec, and IEEE 802.1X. The issuer 1013 is a distinguished name (DN) of a certificate authority that has issued the certificate. The expiration end date 1014 is information of the date on which the certificate becomes invalid. The "details" button 1015 is an icon for displaying detailed information of the certificate. If a user selects the "details" button 1015, the PC 103 transmits a request for displaying the detailed information of the selected certificate to the multifunction peripheral 100. Upon reception of the request for displaying the detailed information of the certificate, the multifunction peripheral 100 acquires the detailed information of the selected certificate from the HDD 204 and generates HTML data of a screen on which the acquired information is displayed. Subsequently, the multifunction peripheral 100 transmits the generated data to the PC 103. Thus, the detailed information of the certificate is displayed on the web browser of the PC 103 as illustrated in FIG. 7, for example. FIG. 7 illustrates an example of the detailed information of the certificate displayed on the PC 103.

Next, a method of setting information of the registration authority 102 in this embodiment will be described. The issuance request for the certificate is transmitted to the registration authority 102. A user selects a "connection setting" button 1002 on the key pair-certificate list screen illustrated in FIG. 5A. The web page control unit 304 of the multifunction peripheral 100 generates HTML data for displaying a connection setting screen and transmits the data to the PC 103. The PC 103 displays a screen generated from the received HTML data.

FIG. 6A illustrates an example of the connection setting screen for connection to the SCEP server that serves as the registration authority 102 of certificates. The connection setting screen illustrated in FIG. 6A includes a field 1016 for inputting the uniform resource locator (URL) of the SCEP server, a field 1017 for inputting a port number to which the SCEP server is connected, and a "set" button 1018 for setting the input setting value. A user inputs, into the above fields, the information of the SCEP server that serves as the registration authority 102. In a case where a certificate is to be issued, the multifunction peripheral 100 transmits an issuance request for the certificate to a registration authority that is the destination set in the field 1016. After the issuance request for the certificate has been transmitted and a certain period of time has elapsed, the multifunction peripheral 100 transmits an acquisition request for the certificate to the destination set in the field 1016. Upon reception of the acquisition request for the certificate, if the registration authority 102 stores a certificate issued by the certificate authority 104, the registration authority 102 transmits the certificate to the multifunction peripheral 100. If the certificate cannot be acquired from the registration authority 102, the multifunction peripheral 100 transmits the acquisition request for the certificate again to the registration authority 102 after a certain period of time has elapsed.

Note that the connection setting screen illustrated in FIG. 6A includes the fields for inputting the address (URL) and the port number of the server that is the destination of the issuance request for the certificate. Other fields for inputting information related to the registration authority 102 other than the above content may also be displayed. For example, there may be a field for setting a timeout time of communication between the multifunction peripheral 100 and the registration authority 102. Furthermore, into the field for inputting the URL of the SCEP server, the address indicating the same domain as the multifunction peripheral 100 may be input. After transmitting the issuance request for the certificate, the multifunction peripheral 100 accesses the registration authority 102 every certain period of time and inquires whether the certificate can be acquired. That is, the multifunction peripheral periodically accesses the registration authority 102 to check whether it can provide the certificate. Although not illustrated in FIG. 6A, a user may set a polling interval and a number of times of retry polling for the above processing on the screen—that is, a user may set the interval between each inquiry and the number of inquiries to make before timing out.

Note that the multifunction peripheral 100 transmits the issuance request for the certificate to the URL and the port number of the SCEP server that is set on the connection setting screen illustrated in FIG. 6A in a case where the acquisition request for the certificate is to be manually or automatically transmitted. By displaying the connected SCEP server as illustrated in FIG. 6A, a user can understand which server the communication is performed with.

In response to selection of the "set" button 1018 by a user on the screen illustrated in FIG. 6A, the key-pair-and-certificate management unit 307 stores, in the HDD 204, the URL and the port number of the server that are input to the respective fields. Then, if the setting is stored correctly in the HDD 204, the screen illustrated in FIG. 6B is displayed on the display unit of the PC 103. In FIG. 6B, a message 1101 is displayed, and the message 1101 indicates that the displayed server URL in the field 1016 and the displayed port number in the field 1017 are set in the multifunction peripheral 100.

Next, a case where a user manually acquires a certificate of a public key will be described. On the certificate list screen illustrated in FIG. 5A, a user selects a "certificate issuance request" button 1004. Then, a certificate issuance request screen illustrated in FIG. 9A is displayed on the PC 103. FIG. 9A is an example of a screen for manually transmitting an issuance request for a certificate of a public key.

The certificate issuance request screen illustrated in FIG. 9A includes a name 1301 of a certificate, a key length 1302 corresponding to an algorithm for setting the key length of a key pair to be generated, and a destination information input field 1303. The certificate issuance request screen further includes signature verification 1304 for verifying a signature that is assigned to a response of the issuance request for the certificate, a key usage 1305 for setting usage of the issued certificate, and a password 1306 included in the issuance request for the certificate. An "execute" button 1307 is a button for starting processing for the issuance request for the certificate of the public key. The key usage 1305 is a checkbox and indicates that a plurality of usages can be set for a single key. In addition, if the user selects a checked checkbox again, the checkbox can be unchecked.

Upon a click (selection) of the "execute" button 1307 by the user after the name 1301 to the password 1306 in FIG. 9A have been input and set, the PC 103 transmits the issuance request for the certificate to the multifunction peripheral 100. The multifunction peripheral 100 stores the setting received from the PC 103 in the HDD 204 and transmits the issuance request for the certificate to the registration authority 102 by using the information set in FIG. 9A. At this time, the multifunction peripheral 100 transmits the issuance request for the certificate to the URL and port number of the SCEP server set on the connection setting screen in FIG. 6A.

If the certificate has been successfully issued and acquired, the screen illustrated in FIG. 9B is displayed on the display unit of the PC 103. A message 1308 is displayed on the screen illustrated in FIG. 9B, and the message 1308 indicates that the certificate has been successfully issued and acquired. In addition, if it is necessary to reboot the multifunction peripheral 100 in order to store the acquired certificate in the HDD 204 and to set the certificate as a valid certificate, a "reboot" button 1309 for selecting reboot of the multifunction peripheral 100 is displayed. If a user selects the "reboot" button 1309, the screen illustrated in FIG. 10B is displayed on the PC 103. Then, the multifunction peripheral 100 stores the acquired certificate in the HDD 204, executes necessary processing for setting the certificate as a valid certificate, and executes reboot processing.

In addition, if the "execute" button 1307 has been selected in FIG. 9A and the issuance request for the certificate has been transmitted to the registration authority 102, but the issuance of the certificate does not end correctly, the screen illustrated in FIG. 1 OA is displayed on the display unit of the PC 103. The case where the issuance of the certificate does not end correctly corresponds to, for example, a case where connection with the registration authority 102 cannot be established or a case where the multifunction peripheral 100 could not acquire the certificate even if a predetermined period of time has elapsed from the transmission of the issuance request for the certificate. A message 1401 is displayed on the screen illustrated in FIG. 10A, and the message 1401 indicates that the certificate issuance and acquisition have failed.

The following description refers to how a user sets certificate update reservation will be described. When a user selects a "reservation setting" button 1005 on the screen in FIG. 5A, the screen illustrated in FIG. 5B is displayed on the PC 103. FIG. 5B is an example of a certificate update reservation setting screen. When a user selects any one of checkboxes 1801, 1802, and 1803, a check mark is displayed in the selected checkbox. If a user selects the checked checkbox again, the check mark is no longer displayed. If an "update" button 1806 is selected, the PC 103 transmits the set setting value to the multifunction peripheral 100. The key-pair-and-certificate management unit 307 of the multifunction peripheral 100 stores the received information in the HDD 204. At this time, the key-pair-and-certificate management unit 307 stores information as to whether each checkbox is checked in the HDD 204. If any one of the checkboxes 1801, 1802, and 1803 is checked, the multifunction peripheral 100 determines that the certificate update reservation is set to be valid. On the other hand, if none of the checkboxes 1801, 1802, and 1803 is checked, the multifunction peripheral 100 determines that the certificate update reservation is set to be invalid.

The checkbox 1801 is a checkbox for setting a certificate updating date. If the checkbox 1801 is selected, a user can set the date and time for starting an acquisition request for a certificate. At the specified time on the specified date, the multifunction peripheral 100 transmits an issuance request for the certificate to the registration authority 102.

The checkbox 1802 is a checkbox for determining the updating date and time on the basis of the expiration of the certificate. If the checkbox 1802 is selected, a user can set, as the certificate updating date, the number of days that is earlier than the expiration of the certificate held by the multifunction peripheral 100.

The checkbox 1803 is a checkbox for setting an updating period of the certificate. If the checkbox 1803 is selected, a user can set the updating period of the certificate. The user can select any of the following as the updating period: the number of days in a period; a day specified by the user in each month; and a date specified by the user in each year. For example, in the setting in FIG. 5B, on a day that is 14 days earlier than the expiration of the currently held certificate, the multifunction peripheral 100 transmits an issuance request for a new certificate to the certificate authority 104 and acquires the new certificate. Note that if none of the checkboxes 1801, 1802, and 1803 is selected, the multifunction peripheral 100 determines that the certificate update reservation is set to be invalid. In this embodiment, the checkboxes 1801 to 1803 and setting values related to the checkboxes 1801 to 1803 are collectively called "certificate update reservation setting".

The certificate update reservation setting screen illustrated in FIG. 5B further includes a region 1804 for setting information of a public key and a certificate that are targets of the update reservation setting. The region 1804 is a region for setting the name, length, usage, algorithm, and the like of the key whose certificate issuance request is automatically transmitted. The user inputs information for the update reservation setting and setting of the key and the certificate that are targets of the issuance request and selects the "update" button 1806, and thereby the certificate update reservation setting is stored in the HDD 204. Although the user inputs information for the setting of the key and the certificate that are targets of the issuance request in this embodiment, a public key that is the target of the update reservation may be selected from public keys stored in a database of keys and certificates.

The "update" button 1806 on the certificate update reservation setting screen in FIG. 5B is a button for executing processing in which the content set on the update reservation setting screen is transmitted to the multifunction peripheral 100 and the setting values are stored in the HDD 204 of the multifunction peripheral 100. A "cancel" button 1807 is a button for interrupting the update reservation setting. If the "cancel" button 1807 is selected, the update reservation setting screen is displayed on the display unit of the PC 103 in a state where the current setting values stored in the HDD 204 of the multifunction peripheral 100 are input in the respective input forms on the update reservation setting screen illustrated in FIG. 5B.

Note that automatic certificate deletion can be set only on the update reservation setting screen in FIG. 5B in this embodiment. Alternatively, the automatic certificate deletion can be set on the certificate issuance request screen illustrated in FIG. 9A.

Through the above operation, information of the certificate stored in the HDD 204 of the multifunction peripheral 100 is displayed, and information related to the issuance of the certificate is set in this embodiment. In the above description, each of the "connection setting" button 1002, the "certificate issuance request" button 1004, and the "reservation setting" button 1005 displayed on the certificate list screen illustrated in FIG. 5A causes transition to a corresponding screen. Not only the buttons on the certificate list screen illustrated in FIG. 5A, but also any of buttons 1001, 1002, 1004, and 1005 displayed in a region 1020 of each screen can mutually cause transition to a corresponding screen. On each screen, if a user selects the "certificate list" button 1001, the certificate list screen illustrated in FIG. 5A is displayed on the PC 103.

Here, a screen displayed when a user is to execute connection setting in a state where the certificate update reservation is set to be valid in this embodiment will be described. In this embodiment, as long as the certificate update reservation is set to be valid, change of the connection setting is not allowed. Thus, when an issuance request for a reserved certificate is transmitted, the issuance request for the certificate is prevented from being transmitted to an unintended server, preventing a failure of the issuance of a reserved certificate.

Figure 8:
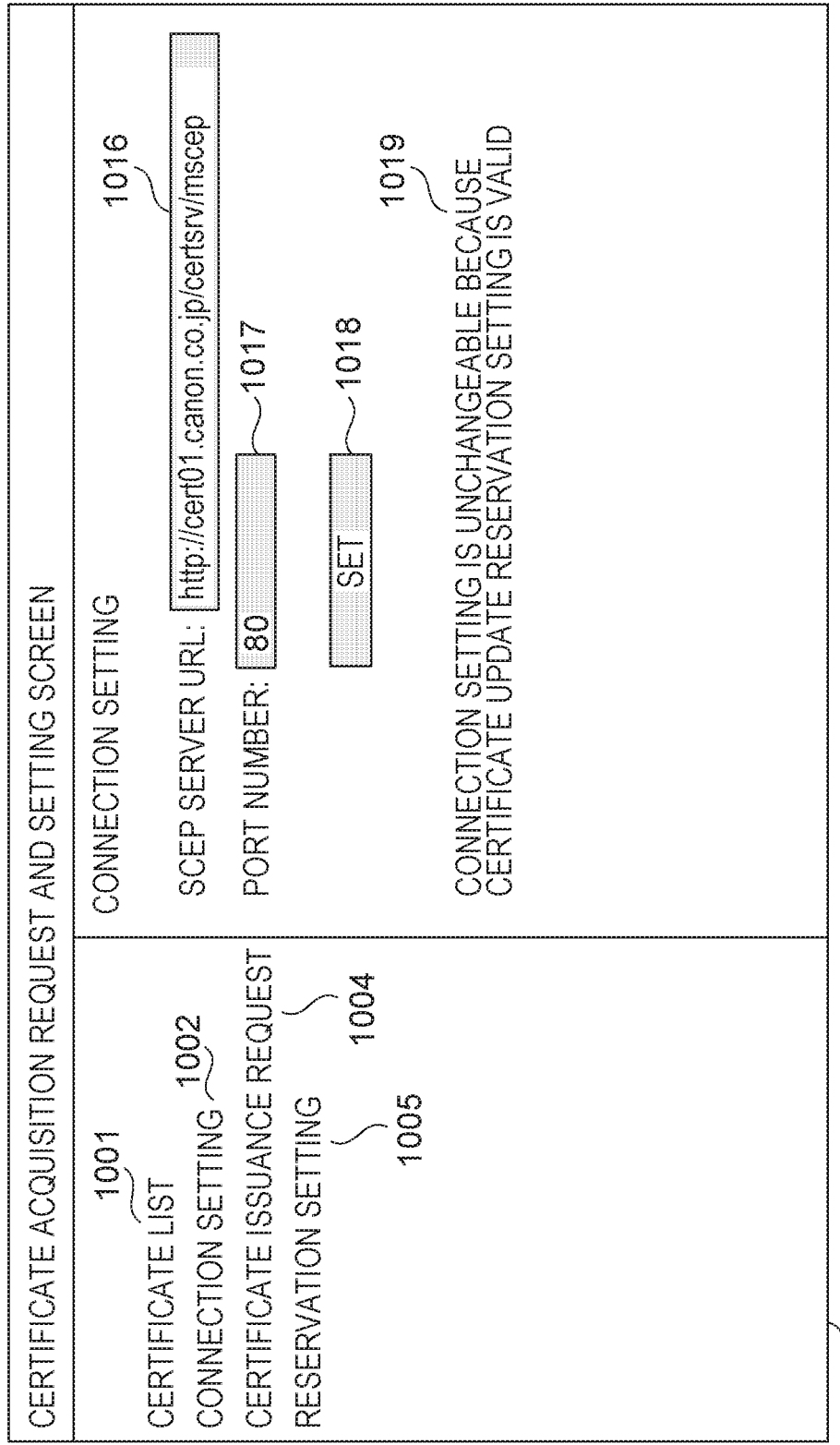
FIG. 8 illustrates an example of a screen that is displayed on the PC, on which inputs for connection setting are unacceptable according to this embodiment.

The connection setting screen illustrated in FIG. 8 is an example of a screen displayed when a user selects the "connection setting" button 1002 in a state where the certificate update reservation is set to be valid. In FIG. 8, the input fields are grayed out, and a user is not allowed to input a character string to the input fields. In addition, the "set" button 1018 is set to be invalid, and a user is not allowed to select the "set" button 1018. Furthermore, since the certificate update reservation is set to be valid on the screen illustrated in FIG. 8, a message 1019 indicating that the connection setting is not allowed to be changed is displayed. By the display of the message 1019, the user understands why the connection setting is not allowed to be changed.

In addition, currently set setting values of setting items are displayed in the input fields on the connection setting screen illustrated in FIG. 8. The setting values displayed here are setting values used when an issuance request for a certificate is transmitted regardless of manual or automatic transmission. That is, by checking this screen, a user can understand which port of which server the issuance request for the certificate is to be transmitted. Thus, the connection setting screen illustrated in FIG. 8 serves as a check screen for checking the connected apparatus. When the certificate is to be issued, the multifunction peripheral 100 accesses the registration authority 102 every certain period of time to inquire whether the issuance of the certificate has been completed. As long as the certificate update reservation is set to be valid, by preventing the server address from being changed, it is possible to transmit the inquiry to the same destination (server) to which the issuance request for the certificate is transmitted.

Next, a process in which a user manually acquires a certificate will be described with reference to FIG. 14. The process illustrated in FIG. 14 is realized by the key-pair-and-certificate acquisition control unit 305 executing a program stored in the ROM 202 or the HDD 204.

Figure 14:
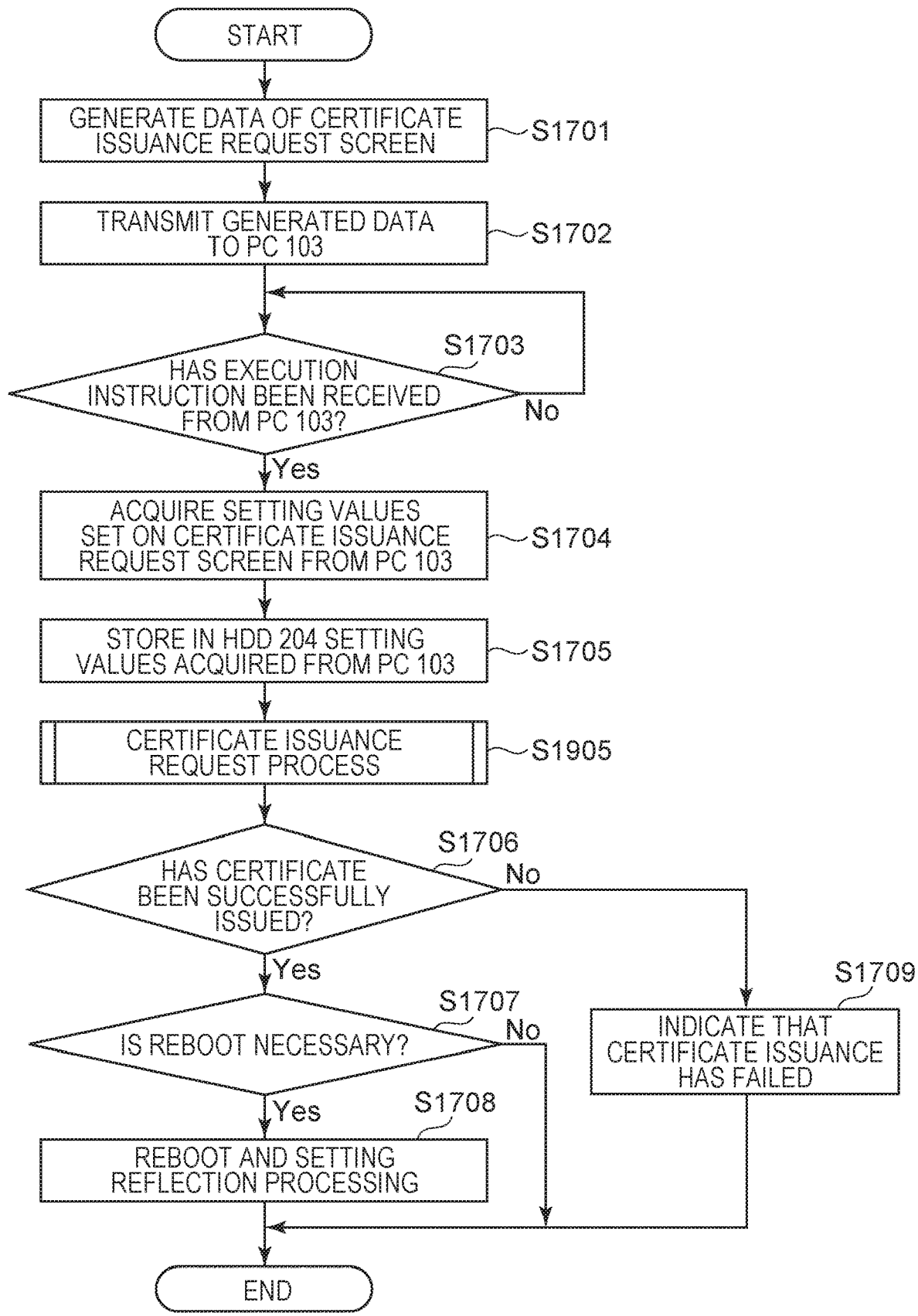
FIG. 14 is a flowchart illustrating an example of a process in which the electronic certificate is manually acquired according to this embodiment.

The process illustrated in FIG. 14 is started when a user selects the "certificate issuance request" button 1004 on the certificate list screen illustrated in FIG. 5A and the key-pair-and-certificate acquisition control unit 305 receives an instruction for displaying the certificate issuance request screen through the communication control unit 303.

In S1701, the key-pair-and-certificate acquisition control unit 305 controls the web page control unit 304 that generates HTML data of the certificate issuance request screen illustrated in FIG. 9A. Then, in S1702, the key-pair-and-certificate acquisition control unit 305 transmits the generated HTML data to the PC 103. On the basis of the HTML data received from the multifunction peripheral 100, the PC 103 displays the certificate issuance request screen on the display unit.

In S1703, the key-pair-and-certificate acquisition control unit 305 determines whether an instruction for executing the certificate acquisition processing has been received from the PC 103. In response to selection of the "execute" button 1307 by the user on the certificate issuance request screen, the PC 103 instructs the multifunction peripheral 100 to execute the certificate acquisition processing. The key-pair-and-certificate acquisition control unit 305 of the multifunction peripheral 100 receives the instruction for executing the certificate acquisition processing that is received through the communication control unit 303. If the key-pair-and-certificate acquisition control unit 305 receives the instruction for executing the certificate acquisition processing, the process proceeds to S1704. If the key-pair-and-certificate acquisition control unit 305 does not receive the instruction for executing the certificate acquisition processing, S1703 is performed. In this embodiment, processing in which the user inputs a character string in each field on the certificate issuance request screen or selects a radio button is omitted from description. Each time the user inputs a character string on the certificate issuance request screen or selects the radio button, the PC 103 may send a notification of input content to the key-pair-and-certificate acquisition control unit 305 of the multifunction peripheral 100. In this case, the key-pair-and-certificate acquisition control unit 305 receives the input content, controls the web page control unit 304 that generates HTML data of a screen to be displayed on the PC 103, and transmits the data to the PC 103. If the user inputs a character string or the like on the certificate issuance request screen, the PC 103 may generate the data of the screen after input and may display the screen on the display unit of the PC 103. In this case, the key-pair-and-certificate acquisition control unit 305 of the multifunction peripheral 100 acquires content that is set by the user in S1704, which will be described later, after a request for executing the certificate acquisition processing has been received.

In S1704, the key-pair-and-certificate acquisition control unit 305 acquires the setting values that are set on the certificate issuance request screen. Here, the key-pair-and-certificate acquisition control unit 305 acquires a character string that is input in each input field on the certificate issuance request screen and setting values indicating validity of the radio button and a checkbox from the PC 103.

In S1705, the key-pair-and-certificate acquisition control unit 305 stores the setting values acquired in S1704 in the HDD 204. In S1705, the key-pair-and-certificate acquisition control unit 305 controls the key-pair-and-certificate management unit 307. The key-pair-and-certificate management unit 307 registers the setting value acquired by the key-pair-and-certificate acquisition control unit 305 in a certificate database illustrated in any of FIGS. 5A to 5C. At this time, no setting values are stored ("none") for data that is not determined until the certificate is issued, such as the expiration start and end dates of the certificate. Alternatively, predetermined values may be set as the setting values that are not determined until the certificate is issued.

In S1905, the key-pair-and-certificate acquisition control unit 305 executes a certificate issuance request process, which will be described later. In S1905, the key-pair-and-certificate acquisition control unit 305 reads the setting values that are stored in the certificate database in S1705 and executes the certificate issuance request process.

In S1706, the key-pair-and-certificate acquisition control unit 305 determines whether the certificate has been successfully issued. In S1706, the key-pair-and-certificate acquisition control unit 305 acquires flag information indicating whether the certificate has been successfully acquired or the acquisition has failed, from the RAM 203 and determines whether the certificate has been successfully acquired. If the certificate has been successfully acquired, the key-pair-and-certificate acquisition control unit 305 executes the process in and after S1707.

In S1707, the key-pair-and-certificate acquisition control unit 305 determines whether reboot is necessary in order to set the acquired certificate as a valid certificate. In this embodiment, the necessity for reboot is determined for each setting value that is set as the certificate usage. However, the multifunction peripheral 100 may reboot in any case or may not reboot for any usage. In S1707, the key-pair-and-certificate acquisition control unit 305 determines whether the usage of the acquired certificate is set as usage for which reboot is necessary, and if it is determined that reboot is necessary, S1708 is performed. On the other hand, if the usage of the certificate does not need reboot, the key-pair-and-certificate acquisition control unit 305 ends the process illustrated in FIG. 14.

In S1708, the key-pair-and-certificate acquisition control unit 305 executes reboot processing of the multifunction peripheral 100. In S1708, the key-pair-and-certificate acquisition control unit 305 controls the web page control unit 304 that generates HTML data of the screen illustrated in FIG. 9B, and transmits the generated HTML data to the PC 103. Upon reception of an instruction for selecting the "reboot" button 1309 from the PC 103, the key-pair-and-certificate acquisition control unit 305 instructs the device control unit 310 to reboot the multifunction peripheral 100. If the "reboot" button 1309 is selected, the web page control unit 304 generates HTML data of the screen illustrated in FIG. 10B and transmits the data to the PC 103. Then, the device control unit 310 executes reboot processing of the multifunction peripheral 100. In this embodiment, the reboot processing is started upon an instruction from a user. However, the multifunction peripheral 100 may automatically start the reboot processing if it is determined that reboot is necessary.

If the acquisition of a certificate has failed in S1706, the key-pair-and-certificate acquisition control unit 305 executes S1709. In S1709, the key-pair-and-certificate acquisition control unit 305 controls the web page control unit 304 that generates HTML data of a screen that indicates that the acquisition of a certificate has failed, and transmits the data to the PC 103. In this example, the web page control unit 304 generates HTML data of the screen illustrated in FIG. 10A and transmits the data to the PC 103. The PC 103 displays the screen illustrated in FIG. 10A on the display unit.

Figure 11:
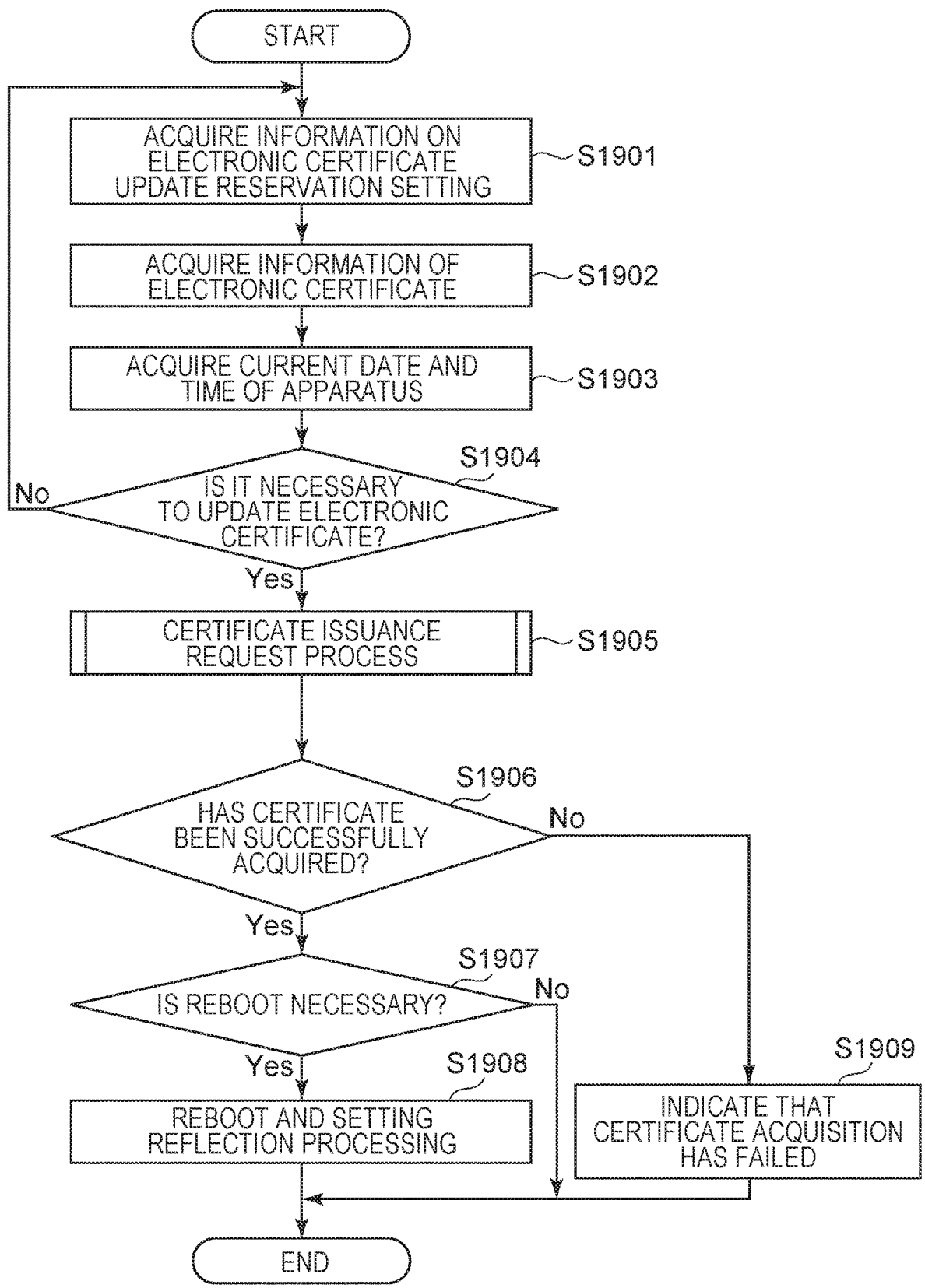
FIG. 11 is an example of a flowchart illustrating a process in which the electronic certificate whose updating is reserved is issued according to this embodiment.

Next, a process executed by the multifunction peripheral 100 if the certificate update reservation is set to an enable state will be described with reference to FIG. 11. A program for executing the process illustrated in FIG. 11 is stored in a storage device such as the HDD 204 or the ROM 202 of the multifunction peripheral 100. The key-pair-and-certificate acquisition control unit 305 executes the program to realize the process.

In S1901, the key-pair-and-certificate acquisition control unit 305 acquires information on the certificate update reservation setting. The key-pair-and-certificate acquisition control unit 305 controls the key-pair-and-certificate management unit 307 to acquire the information on the certificate update reservation setting from the HDD 204.

Then, in S1902, the key-pair-and-certificate acquisition control unit 305 acquires information of a currently used certificate from the key-pair-and-certificate management unit 307. The key-pair-and-certificate acquisition control unit 305 receives an acquisition request for the information of the currently used certificate from the key-pair-and-certificate management unit 307, and acquires the information of the currently used certificate from the HDD 204. The key-pair-and-certificate management unit 307 transmits the information of the certificate acquired from the HDD 204 to the key-pair-and-certificate acquisition control unit 305. In S1902, the information of the currently used certificate is, for example, information that is stored in the database and that indicates detailed information of the key pair and the certificate illustrated in FIG. 4A and is information about the expiration start and end dates.

Then, in S1903, the key-pair-and-certificate acquisition control unit 305 acquires the current date and time managed by the multifunction peripheral 100. A known method is used as a method by which the key-pair-and-certificate acquisition control unit 305 acquires the date and time. For example, the key-pair-and-certificate acquisition control unit 305 acquires the date and time from a real time clock (RTC) on a controller board (not illustrated) included in the multifunction peripheral 100.

In S1904, on the basis of the certificate update reservation setting, the information of the certificate, and the information of the current date and time, the key-pair-and-certificate acquisition control unit 305 determines whether it is necessary to update the currently used certificate. If the key-pair-and-certificate acquisition control unit 305 determines in S1904 that it is not necessary to update the certificate, the key-pair-and-certificate acquisition control unit 305 returns to S1901. Here, an example of a method by which the key-pair-and-certificate acquisition control unit 305 determines in S1904 whether it is necessary to update the certificate will be described. The determination in S1904 is not limited to the following method.

First, in a case where the updating date is specified in the certificate update reservation setting, the key-pair-and-certificate acquisition control unit 305 determines whether the expiration start date of the currently used certificate acquired in S1902 is before the updating date specified in the certificate update reservation setting. If the expiration start date is after the updating date specified in the certificate update reservation setting, update of the certificate specified in the certificate update reservation setting has been completed, and thus, the certificate is not updated again. If the expiration start date of the certificate is before the updating date specified in the certificate update reservation setting, the updating date specified in the certificate update reservation setting acquired in S1901 and the current date and time acquired in S1903 are compared with each other. It is determined whether the current date and time are after the date and time for starting an acquisition request specified in the certificate update reservation setting. If the current date and time are after the date and time for starting an acquisition request specified in the certificate update reservation setting, the key-pair-and-certificate acquisition control unit 305 determines that it is necessary to update the certificate.

Next, a case where the certificate is set to be updated before the expiration end date by a predetermined number of days will be described. On the basis of the expiration end date of the currently used certificate acquired in S1902 and the current date and time acquired in S1903, the key-pair-and-certificate acquisition control unit 305 calculates the number of remaining days until the expiration of the certificate. The key-pair-and-certificate acquisition control unit 305 compares the calculated number of remaining days until the expiration of the certificate and the number of days specified in the certificate update reservation setting of the certificate acquired in S1901 with each other. If the number of remaining days until the expiration of the certificate is less than the number of days specified in the certificate update reservation setting, the key-pair-and-certificate acquisition control unit 305 determines that it is necessary to update the certificate.

Next, a case where the certificate is set to be updated in a predetermined period will be described. In a case where the updating period is set, on the basis of the expiration start date of the currently used certificate and the current date, the key-pair-and-certificate acquisition control unit 305 calculates the number of days that have elapsed from the expiration start date of the certificate. If the calculated number of days corresponds with the specified updating period, the key-pair-and-certificate acquisition control unit 305 determines that it is necessary to update the certificate. In a case where a predetermined day in each month or a predetermined date in each year is set as the updating period, the key-pair-and-certificate acquisition control unit 305 compares the day or date specified in the certificate update reservation setting and the current date with each other, and if the two items corresponds with each other, determines that it is necessary to update the certificate.

Figure 12A:
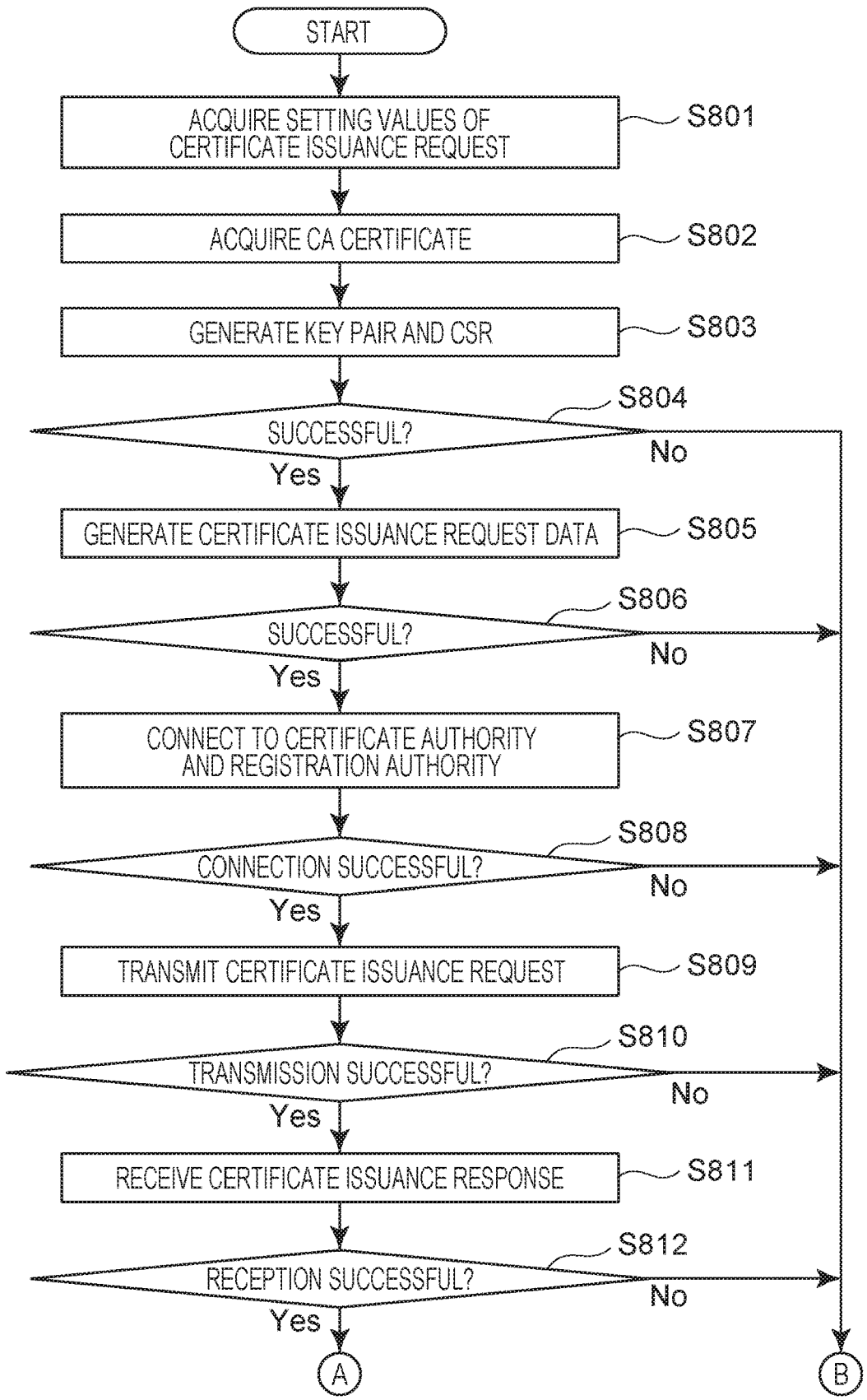
FIGS. 12A and 12B are an example of a flowchart illustrating a process in which the electronic certificate is issued according to this embodiment.
Figure 12B:
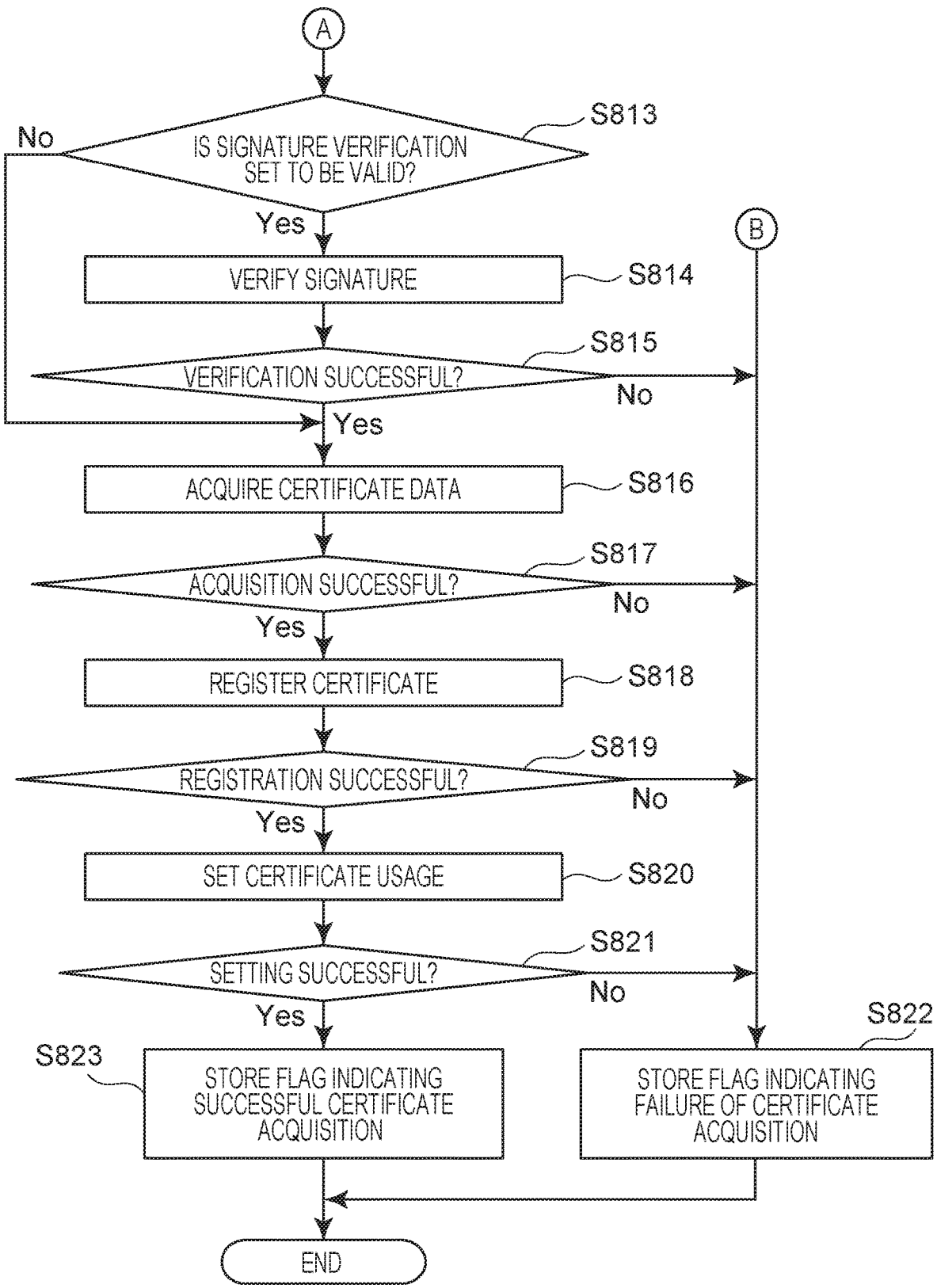

If it is determined that it is necessary to update the certificate, the process proceeds to S1905, and the key-pair-and-certificate acquisition control unit 305 executes the certificate issuance request process illustrated in FIGS. 12A and 12B. Then, upon completion of the process illustrated in FIGS. 12A and 12B, the process in FIG. 11 proceeds to S1906. The certificate issuance request process will be described later in detail with reference to FIGS. 12A and B.

In S1906, the key-pair-and-certificate acquisition control unit 305 determines whether the certificate has been successfully acquired. In S1906, the key-pair-and-certificate acquisition control unit 305 refers to a flag of the certificate stored in the RAM 203 so as to determine whether the certificate has been successfully acquired. If the certificate has been successfully acquired, the key-pair-and-certificate acquisition control unit 305 executes S1907. On the other hand, if the acquisition of the certificate has failed, the key-pair-and-certificate acquisition control unit 305 executes S1909. In S1909, the key-pair-and-certificate acquisition control unit 305 controls the UI control unit 308 to display a screen indicating that the acquisition of the certificate has failed on the operation panel 212. Note that S1909 may be any processing in which the user is notified that the acquisition of the certificate has failed. For example, the multifunction peripheral 100 may send an email indicating that the acquisition of the certificate has failed to an email address registered in the multifunction peripheral 100 in advance.

In S1907, the key-pair-and-certificate acquisition control unit 305 determines whether reboot is necessary in order to reflect the setting of the certificate that is newly acquired after the certificate has been updated. In this embodiment, for each usage of the certificate, it is determined whether reboot is necessary. If it is determined that reboot is necessary, in S1907, the key-pair-and-certificate acquisition control unit 305 instructs the device control unit 310 to reboot the multifunction peripheral 100 through the communication control unit 303. Upon reception of the instruction from the key-pair-and-certificate acquisition control unit 305, the device control unit 310 reboots the multifunction peripheral 100. Then, the certificate automatic updating processing illustrated in this flowchart ends. If it is determined in S1906 that reboot is unnecessary, the key-pair-and-certificate acquisition control unit 305 ends the process illustrated in this flowchart.

Next, a process in which the multifunction peripheral 100 acquires a certificate of a public key will be described with reference to FIGS. 12A and 12B. FIGS. 12A and 12B are the process performed in S1905 in FIG. 11 and FIG. 14.

A program for executing the process illustrated in FIGS. 12A and 12B is stored in the HDD 204 or the ROM 202. The key-pair-and-certificate acquisition control unit 305 executes the program to realize the process.

In S801, the key-pair-and-certificate acquisition control unit 305 acquires information of a certificate from the key-pair-and-certificate management unit 307. The key-pair-and-certificate acquisition control unit 305 requests the certificate authority 104 to issue the certificate. Examples of the information acquired by the key-pair-and-certificate acquisition control unit 305 in S801 include the name 1301, the key length 1302, the destination information input field 1303, the signature verification 1304, the key usage 1305, and the like. The key-pair-and-certificate management unit 307 acquires the above information from the HDD 204 and transmits the information to the key-pair-and-certificate acquisition control unit 305.

Then, from the key-pair-and-certificate management unit 307, the key-pair-and-certificate acquisition control unit 305 acquires a certificate of the registration authority to be used. In S802, the key-pair-and-certificate acquisition control unit 305 requests the key-pair-and-certificate management unit 307 to acquire the certificate of the registration authority. The key-pair-and-certificate management unit 307 acquires the certificate of the registration authority from the HDD 204 and transmits the acquired certificate of the registration authority to the key-pair-and-certificate acquisition control unit 305. In this embodiment, a known method may be used as a method for acquiring the certificate of a server that serves as the registration authority.

Then, in S803, the key-pair-and-certificate acquisition control unit 305 generates a key pair based on the information of the name 1301 and the key length 1302 acquired in S801. A known method is used as a method for generating a private key and a public key that corresponds to the private key. The key-pair-and-certificate acquisition control unit 305 further generates certificate signing request (CSR) data based on the destination information that is input in the destination information input field 1303 and the information of the password 1306. The CSR is data in the form of PKCS #10 (RFC2986: PKCS #10: Certification Request Syntax Specification).

Then, in S804, the key-pair-and-certificate acquisition control unit 305 determines whether the key pair and CSR data have been successfully generated in S803. If it is determined that the key pair and the CSR data have been successfully generated, the key-pair-and-certificate acquisition control unit 305 proceeds to S805. If it is determined that the generation of the key pair has failed or that the generation of the CSR data has failed, the key-pair-and-certificate acquisition control unit 305 proceeds to S822.

In S805, the key-pair-and-certificate acquisition control unit 305 generates certificate issuance request data. The issuance request data generated in S805 is data in the form of PKCS #7 defined by SCEP. In S806, the key-pair-and-certificate acquisition control unit 305 determines whether the certificate issuance request data has been successfully generated. If the generation of the certificate issuance request data has failed, the key-pair-and-certificate acquisition control unit 305 proceeds to S822. If the certificate issuance request data has been successfully generated in S806, the key-pair-and-certificate acquisition control unit 305 proceeds to S807.

In S807, the key-pair-and-certificate acquisition control unit 305 connects the multifunction peripheral 100 to the SCEP server that is set as the registration authority 102 on the connection setting screen in FIG. 6A using TCP/IP.

Then, in S808, the key-pair-and-certificate acquisition control unit 305 determines whether the connection in S807 has been successful. If the connection to the registration authority 102 has been successful, the key-pair-and-certificate acquisition control unit 305 proceeds to S809: if the connection has failed, the key-pair-and-certificate acquisition control unit 305 proceeds to S822. In S809, the key-pair-and-certificate acquisition control unit 305 transmits the certificate issuance request data generated in S805 using HTTP GET or POST method. Then, in S810, the key-pair-and-certificate acquisition control unit 305 determines whether the certificate issuance request data has been successfully transmitted in S809. If the certificate issuance request data has been successfully transmitted, the key-pair-and-certificate acquisition control unit 305 proceeds to S811; if the transmission of the certificate issuance request data has failed, the key-pair-and-certificate acquisition control unit 305 proceeds to S822.

In S811, the key-pair-and-certificate acquisition control unit 305 receives response data with respect to the certificate issuance request from the registration authority 102. In S811, the key-pair-and-certificate acquisition control unit 305 transmits an acquisition request for the response data including an issued certificate to the registration authority 102 every certain period of time. If the issuance of the certificate has been completed, the key-pair-and-certificate acquisition control unit 305 receives the response data including the certificate transmitted from the registration authority 102 in response to the acquisition request.

Then, in S812, the key-pair-and-certificate acquisition control unit 305 determines whether the response data has been successfully received in S811. If the response data has been successfully received, the key-pair-and-certificate acquisition control unit 305 proceeds to S814; if the reception has failed, the key-pair-and-certificate acquisition control unit 305 proceeds to S822. In this embodiment, if the reception of the response data has failed, the process illustrated in FIGS. 12A and 12B ends. However, the process may return to S811 after a predetermined period of time has elapsed, and the key-pair-and-certificate acquisition control unit 305 may transmit the acquisition request for the response data again to the registration authority 102. If the response data cannot be acquired even when the acquisition request for the response data is transmitted to the registration authority 102 for a predetermined number of times, the key-pair-and-certificate acquisition control unit 305 may end the process illustrated in FIGS. 12A and 12B.

In S812, on the basis the setting of the signature verification 1304 acquired in S801, the key-pair-and-certificate acquisition control unit 305 determines whether the signature verification is set to be valid. If the signature verification is set to be valid, the key-pair-and-certificate acquisition control unit 305 proceeds to S814; if the signature verification is set to be invalid, the key-pair-and-certificate acquisition control unit 305 proceeds to S816.

In S814, the key-pair-and-certificate acquisition control unit 305 controls the encryption processing unit 306 and verifies signature data that is assigned to the data received in S811 by using the public key included in the certificate of the registration authority acquired in S802. Then, in S815, the key-pair-and-certificate acquisition control unit 305 determines whether the signature verification in S815 has been successful. If the signature verification has been successful, the key-pair-and-certificate acquisition control unit 305 proceeds to S816. If the signature verification has failed, the key-pair-and-certificate acquisition control unit 305 proceeds to S822.

In S816, the key-pair-and-certificate acquisition control unit 305 analyzes the data received in S811 and acquires certificate data included in the response data. At this time, the encryption processing unit 306 analyzes the response data and acquires the certificate. Then, in S817, the key-pair-and-certificate acquisition control unit 305 determines whether the certificate has been successfully acquired in S816. If the certificate has been successfully acquired, the key-pair-and-certificate acquisition control unit 305 proceeds to S819; if the acquisition has failed, the key-pair-and-certificate acquisition control unit 305 proceeds to S822. In S818, the key-pair-and-certificate acquisition control unit 305 registers the certificate acquired in S816 as a certificate that corresponds to the key pair generated in S803. At this time, the key-pair-and-certificate acquisition control unit 305 controls the key-pair-and-certificate management unit 307 and stores the key pair generated in S803 and the acquired certificate in a predetermined directory in the HDD 204 in which key pairs and certificates are stored. At this time, the key-pair-and-certificate management unit 307 adds information of the key pair generated in S803 and the acquired certificate to the database of key pairs and certificates illustrated in FIG. 4A. In FIG. 4B, a key pair-certificate Cert4 is newly added.

Then, in S819, the key-pair-and-certificate acquisition control unit 305 determines whether the certificate has been successfully registered in S818. If the certificate has been successfully registered, the key-pair-and-certificate acquisition control unit 305 proceeds to S820; if the registration has failed, the key-pair-and-certificate acquisition control unit 305 proceeds to S822. In S820, the key-pair-and-certificate acquisition control unit 305 controls the key-pair-and-certificate management unit 307, and sets the usage of the certificate on the basis of the information of the key usage 1305 acquired in S801. At this time, the key-pair-and-certificate management unit 307 updates the information of the usage in the list of key-pair-and-certificate detailed information as illustrated in FIG. 4C, for example. In FIG. 4C, the key-pair-and-certificate used for TLS is changed from Cert1 to Cert4. In S821, the key-pair-and-certificate acquisition control unit 305 determines whether the usage of the certificate has been successfully set. If the usage has been successfully set, the key-pair-and-certificate acquisition control unit 305 proceeds to S823; if the setting has failed, the key-pair-and-certificate acquisition control unit 305 proceeds to S822.

In S822, the key-pair-and-certificate acquisition control unit 305 stores, in the RAM 203, a flag indicating that the acquisition of the certificate has failed and ends the process illustrated in this flowchart.

In S823, the key-pair-and-certificate acquisition control unit 305 stores, in the RAM 203, a flag indicating that the certificate has been successfully acquired and ends the process illustrated in this flowchart.

The above process is the control related to the issuance request for the certificate, and reception of the certificate, and setting of the communication usage in the multifunction peripheral 100. In this embodiment, the processing including the issuance request, reception, and the setting of the communication usage is collectively referred to as "certificate automatic updating function".

While the certificate update reservation is set to be valid, if the address or port number of the registration authority 102 is changed to a wrong address or a wrong port number, it is not possible to access the registration authority 102 when executing S807 to S811 in FIG. 12A. In addition, while the multifunction peripheral 100 is executing S807 to S811 in FIG. 12A, if a user changes setting related to the registration authority 102, it is not possible to complete the certificate update processing. Thus, in this embodiment, as long as the certificate update reservation is set to be valid, by executing the following processes illustrated in FIGS. 13A and 13B, the display is controlled so as to prevent change of information of an apparatus to which the issuance request for the certificate is transmitted. Thus, as long as the certificate update reservation is set to be valid, the information of an apparatus to which the issuance request for the certificate is transmitted is not changed, preventing a failure of reserved certificate issuance.

Figure 13A:
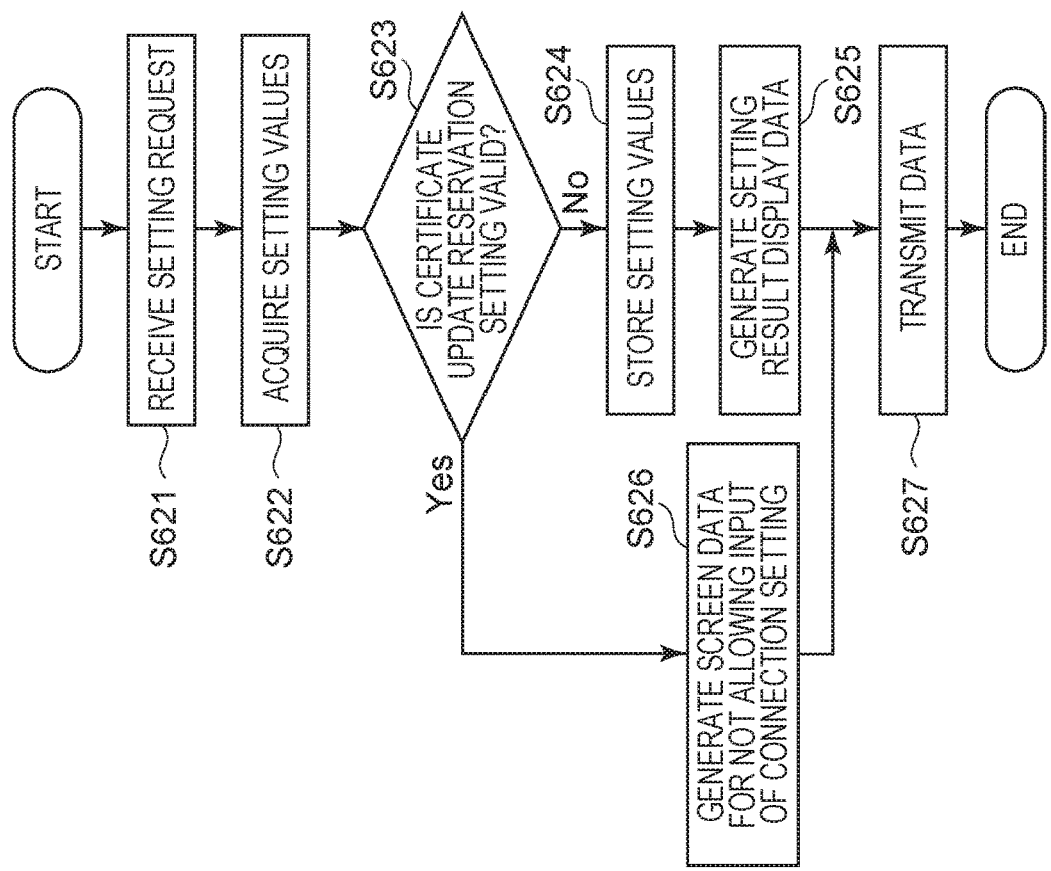
FIGS. 13A and 13B are flowcharts illustrating processes in which the connection setting screen is displayed according to this embodiment.

FIG. 13A is a flowchart illustrating a process in which the multifunction peripheral 100 generates the connection setting screen illustrated in FIG. 6A. A program for executing the process illustrated in FIG. 13A is stored in the HDD 204 or the ROM 202. The web page control unit 304 executes the program so as to realize the following process.

The process illustrated in FIG. 13A is started when a user operates the PC 103 and clicks the "connection setting" button 1002 in FIG. 5A, so that the web page control unit 304 of the multifunction peripheral 100 receives a display request for the connection setting screen.

In S611, the web page control unit 304 acquires the certificate update reservation setting from the HDD 204. As the certificate update reservation setting stored in the HDD 204, the setting values that are set on the certificate update reservation screen illustrated in FIG. 5B are acquired. In S611, the web page control unit 304 acquires setting values indicating whether each of the checkboxes 1801, 1802, and 1803 is valid or invalid in the certificate update reservation setting acquired from the HDD 204.

In S612, the web page control unit 304 determines whether the certificate update reservation is set to be valid. If, with reference to the setting values acquired in S611, any one of the checkboxes 1801, 1802, and 1803 is set to be valid, the web page control unit 304 determines that the certificate update reservation is set to be valid. If none of the checkboxes 1801, 1802, and 1803 is set to be valid, the web page control unit 304 determines that the certificate update reservation is set to be invalid.

If it is determined in S612 that the certificate update reservation is set to be invalid, in S613, the web page control unit 304 generates HTML data for displaying a web page screen on the PC 103. On the web page screen, the connection setting illustrated in FIG. 6A is acceptable. In S612, the web page control unit 304 acquires UI parts for inputting the URL and port number of the SCEP server from the HDD 204. Furthermore, the web page control unit 304 acquires information of the URL and port number of the currently set SCEP server from the HDD 204. The web page control unit 304 combines data of the acquired UI parts and information of the URL and port number of the SCEP server to generate HTML data for displaying the connection setting screen. Thus, HTML data for displaying the screen illustrated in FIG. 6A on which a character string can be input into each input field can be generated.

If it is determined in S612 that the certificate update reservation is set to be valid (i.e. an enable state), the web page control unit 304 proceeds to S614. In S614, the web page control unit 304 generates HTML data of the web page screen illustrated in FIG. 8, on which inputs for connection setting are unacceptable. The web page control unit 304 acquires data of UI parts that are necessary for configuring the connection setting screen from the HDD 204. In S615, in addition to UI parts for displaying the input form and the "set" button 1018, the web page control unit 304 acquires UI parts for masking inputs from the user. Furthermore, the web page control unit 304 acquires information of URL and port number of the currently set SCEP server from the HDD 204. Then, the web page control unit 304 combines the data of the acquired UI parts and information of the URL and port number of the SCEP server to generate HTML data of the screen illustrated in FIG. 8. At this time, the web page control unit 304 arranges the UI parts for masking inputs from the user to be superposed on the input forms and the "set" button 1018. In case where the user tries to input any character string into an input form or to select the "set" button 1018 where the UI parts are arranged, the web page control unit 304 masks the input. Thus, as long as the certificate update reservation is set to be valid, information of the apparatus to which the issuance request for the certificate is transmitted can be prevented from being changed.

Then, in S615, the web page control unit 304 transmits the HTML data generated in S613 or S614 to the PC 103 and causes the connection setting screen to be displayed on the display unit of the PC 103. Then, the web page control unit 304 ends the process illustrated in FIG. 13A.

By executing the process illustrated in FIG. 13A, as long as the certificate update reservation is set to be valid, the setting of the destination of the acquisition request for the certificate can be prevented from being changed. Thus, as long as the certificate update reservation is set to be valid, it is possible to prevent the destination of the acquisition request for the certificate from being changed to a wrong destination, preventing a failure of reserved certificate update.

Figure 13B:
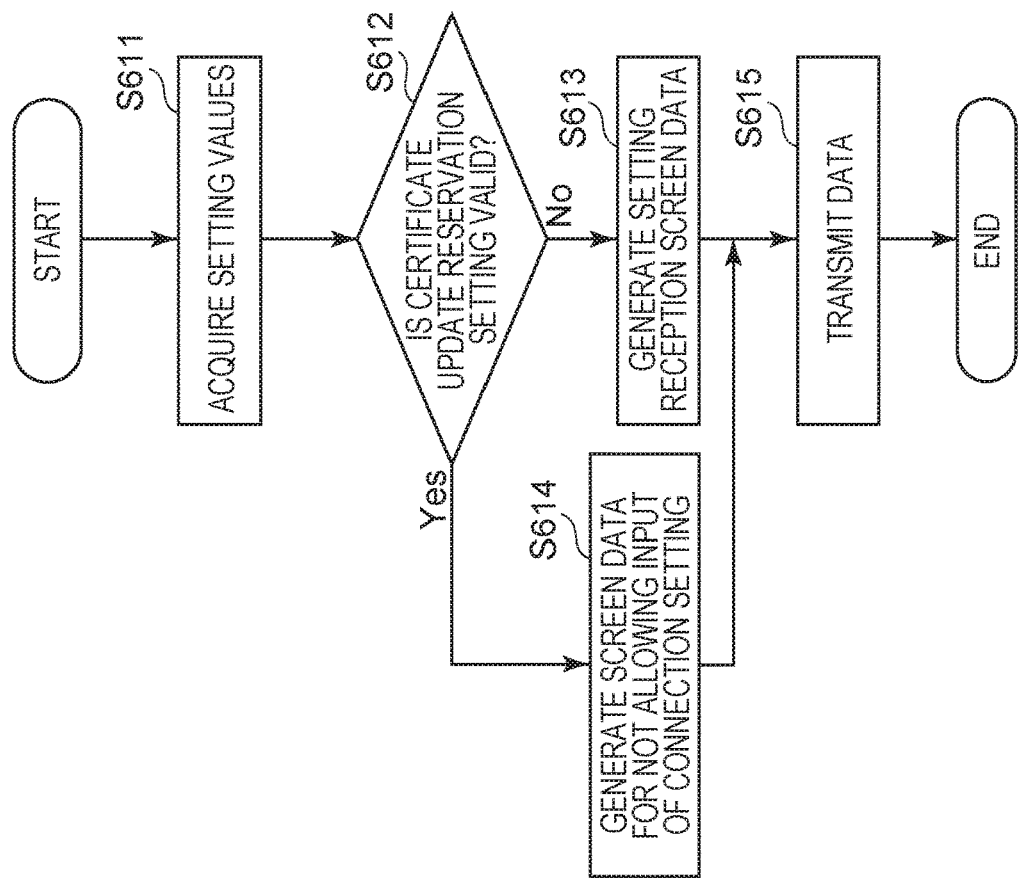

FIG. 13B is a flowchart illustrating a process in which the multifunction peripheral 100 according to this embodiment stores setting values for setting connection to the registration authority 102 in the HDD 204. A program for executing the process illustrated in FIG. 13B is stored in the HDD 204 or the ROM 202. The key-pair-and-certificate management unit 307 reads and executes the program so as to realize the process.

First, in S621, the key-pair-and-certificate management unit 307 receives a connection setting request from the PC 103. The connection setting request is transmitted to the key-pair-and-certificate management unit 307 through the network driver 301, the network control unit 302, and the communication control unit 303.

Then, in S622, the key-pair-and-certificate management unit 307 acquires setting values of the address and the port number of the registration authority 102, and the setting values of the certificate update reservation setting specified in the received connection setting.

In S623, the key-pair-and-certificate management unit 307 determines whether the certificate update reservation is set to be valid. The method for determining whether the certificate update reservation is set to be valid is the same or substantially the same as the method used in S612 in FIG. 13A. If the certificate update reservation is set to be valid in S623, the key-pair-and-certificate management unit 307 proceeds to S626. On the other hand, if the certificate update reservation is set to be invalid, the key-pair-and-certificate management unit 307 proceeds to S624.

In S624, the key-pair-and-certificate management unit 307 stores the setting values of the address and the port number of the registration authority 102 acquired in S622 in the HDD 204. In S625, the key-pair-and-certificate management unit 307 controls the web page control unit 304 that generates HTML data for displaying the web page screen on the PC 103, the screen illustrated in FIG. 6B.

If it is determined in S623 that the certificate update reservation is set to be valid (i.e. an enable state), in S626, the key-pair-and-certificate management unit 307 generates HTML data of the web page screen illustrated in FIG. 8 on which inputs of the connection setting are unacceptable. In this case, inputs on the connection setting screen illustrated in FIG. 6A are not stored in the HDD 204. Here, the method by which the web page control unit 304 generates the HTML data is the same or substantially the same as that for FIG. 13A, and therefore, a description thereof will be omitted.

Then, in S616, the key-pair-and-certificate management unit 307 transmits the HTML data generated in S625 or S626 to the PC 103, and ends the process illustrated in this flowchart.

Through S622 to S626, as long as the certificate update reservation is set to be valid, the multifunction peripheral 100 does not reflect any change of the destination of the acquisition request for the certificate specified by the user. Thus, as long as the certificate automatic updating function is set to be valid, it is possible to prevent the destination of the acquisition request for the certificate from being changed to a wrong destination, preventing a failure of reserved certificate update.

In this embodiment, in addition to the process illustrated in FIG. 13A, the process illustrated in FIG. 13B is also executed. This is because the following case is possible. In a case where a user sets information related to issuance of the certificate by using the RUI function, a plurality of users can access the multifunction peripheral 100 at the same time from different PCs to set the information. Thus, a certain user may set information for connection setting, another user may set information for certificate update reservation setting, and still another user may set information for connection setting by using the connection setting screen. Accordingly, there is a possibility that, before a user completes the connection setting, the other user may set the certificate update reservation setting. In this case, if the connection setting is accepted after the certificate update reservation setting is set to be valid, issuance of the certificate is reserved to an address or a port number that is not indented by the user who has set the certificate update reservation setting. Thus, at the time the connection setting is reflected, it is determined again whether the certificate update reservation is set to be valid, and if the certificate update reservation is set to be valid, the connection setting is controlled not to be accepted.

As described above, both the process illustrated in FIG. 13A and the process illustrated in FIG. 13B are executed in this embodiment. However, only either one of these may be executed.

Note that the address of the registration authority 102 and the port number to which the issuance request for the certificate is transmitted are input on the connection setting screen illustrated in FIG. 6A in this embodiment.

In the above manner, in this embodiment, as long as the setting for automatically acquiring the certificate of the public key is set to be valid, the information of the apparatus to which the issuance request for the certificate is transmitted is controlled not to be changed. Thus, while acquisition of the certificate is reserved, it is possible to prevent the destination of the issuance request for the certificate from being set to a wrong destination or to an unintended destination, preventing a failure of reserved certificate issuance.

Other Embodiments

In the above embodiment, in a case where the certificate update reservation is set to be valid, it is determined that automatic updating of the certificate is set to be valid, and the setting of the destination of the issuance request for the certificate is controlled not to be changed. The period during which automatic updating of the certificate is valid may be a period during which polling processing is executed for the registration authority 102 for acquiring the issued certificate after the multifunction peripheral 100 has transmitted the issuance request for the certificate of the public key to the registration authority 102. In the polling processing, if it is determined that the acquisition of the certificate has failed in S812 in FIG. 12, the multifunction peripheral 100 returns to S811 and transmits an acquisition request for the certificate to the registration authority 102 every certain period of time to acquire the issued certificate. After the multifunction peripheral 100 has transmitted the issuance request for the certificate, if the setting related to the registration authority 102 is changed during the polling processing for receiving the issued certificate, the multifunction peripheral 100 cannot receive the issued certificate. Thus, only during a period from when the issuance request for the certificate is transmitted to when the certificate is acquired, the setting related to the registration authority 102 may be prevented from being changed. Accordingly, it is possible to prevent the registration authority 102 that is registered from being changed, preventing a failure of reception by the multifunction peripheral 100 of the certificate that is issued in response to the transmitted issuance request for the certificate.

The present invention can be implemented by executing the following process. Software (program) for realizing the functions in the above embodiments is supplied to a system or an apparatus via a network or various recording media, and a computer (or a CPU, a micro-processing unit (MPU), or the like) of the system or apparatus reads and executes the program code. In this case, the computer program and the recording medium that stores the computer program constitute the present invention.

According to the present invention, at least from when the information processing apparatus transmits an issuance request for a certificate to when the certificate is acquired, the destination of the issuance request for the certificate can be prevented from being changed on the basis of automatic issuance of the certificate being set to be valid.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

This application claims the benefit of Japanese Patent Application No. 2018-119861, filed Jun. 25, 2018, which is hereby incorporated by reference herein in its entirety.

What is claimed is:

1. An information processing apparatus comprising:
a memory configured to store an electronic certificate of a public key; and
one or more processors configured to execute:
setting a destination of a request for an issuance of the electronic certificate;

receiving an instruction for transmitting the request for the issuance of the electronic certificate to the set destination;

transmitting, based on the received instruction, the request for the issuance of the electronic certificate to the set destination;

acquiring, from the set destination, the electronic certificate that is issued on the basis of the transmitted request;

storing the acquired electronic certificate in the memory;

setting a timing designated by a user for transmitting the request for the issuance of the electronic certificate;

activating a function for transmitting the request at the set timing to the set destination without a need to receive the instruction for transmitting the request; and preventing the set destination from being changed while the function for transmitting the request is activated.

2. The information processing apparatus according to claim 1, wherein the one or more processors are further configured to execute:

displaying a screen indicating the set destination in a case where the function for transmitting the request is activated, wherein the screen does not allow input of the destination.

3. The information processing apparatus according to claim 2, wherein the one or more processors are further configured to execute:

generating Hypertext Markup Language (HTML) data of the screen.

4. The information processing apparatus according to claim 1, wherein the set destination includes at least one of a URL or a port number to which the request is to be transmitted.

5. The information processing apparatus according to claim 1, wherein the one or more processors are further configured to execute:

transmitting the request at intervals set by a user in a case where the function for transmitting the request is activated.

6. The information processing apparatus according to claim 1, wherein the one or more processors are further configured to execute:

setting of either an algorithm used for generating the electronic certificate or a key length.

7. The information processing apparatus according to claim 1, wherein the destination is a System Center Endpoint Protection (SCEP) server.

8. The information processing apparatus according to claim 1, wherein the one or more processors are further configured to execute:

transmitting an acquisition request for acquiring the electronic certificate to the set destination periodically, after the request for the issuance of the electronic certificate is transmitted.

9. A method for controlling an information processing apparatus, the method comprising:

setting a destination of a request for an issurance of the electronic certificate;

receiving an instruction for transmitting the request for the issuance of the electronic certificate to the set destination;

transmitting, based on the received instruction, the request for the issuance of the electronic certificate to the set destination;

acquiring, from an external apparatus that is the set destination, the electronic certificate that is issued on the basis of the transmitted request;

storing the acquired electronic certificate in the memory;

setting a timing designated by a user for transmitting the request for the issuance of the electronic certificate;

activating a function for transmitting the request at the set timing to the set destination without a need to receive the instruction for transmitting the request; and preventing the set destination from being changed while the function for transmitting the request is activated.

10. The information processing apparatus according to claim 1, wherein the function is a function for transmitting the request to the same destination as the destination to which the request was transmitted based on the received instruction.

11. The information processing apparatus according to claim 1, wherein the one or more processors are further configured to execute:

updating the stored electronic certificate with the electronic certificate acquired by the function.

12. The information processing apparatus according to claim 1, wherein the one or more processors are further configured to execute:

not receiving an input of the destination while the function is activated.

13. The information processing apparatus according to claim 1, wherein the one or more processors are further configured to execute:

setting a date, based on a user instruction, of transmitting the request; and transmitting the request to the destination at the set date.

14. The information processing apparatus according to claim 1, wherein the one or more processors are further configured to execute:

displaying a message indicating that the destination is unable to be changed because the function is activated.

15. The information processing apparatus according to claim 1, wherein the one or more processors are further configured to execute:

changing the set destination to a destination inputted by the user in a case where the function is inactivated; and transmitting the request, based on the instruction, to the changed destination.

16. An information processing apparatus comprising a memory configured to store an electronic certificate of a public key and one or more processors configured to execute:

setting a destination;

receiving from a user a first instruction, upon receiving which a request for issuing the electronic certificate is transmitted;

transmitting the request to the set destination upon receiving the first instruction;

storing the electronic certificate received from the set destination;

activating a function for transmitting the request at a set timing;

transmitting the request at the set timing to the set destination; and preventing the set destination from being changed while the function is activated.

17. The information processing apparatus according to claim 16, wherein the set timing is a timing set in accordance with a user instruction.

18. The information processing apparatus according to claim 16, wherein the destination includes at least one of a URL or a port number.

19. The information processing apparatus according to claim 16, wherein the destination is able to be changed based on an operation by the user in a case where the function is not activated.

20. The information processing apparatus according to claim 16, wherein the set timing is a date when the request is to be transmitted.

* * * * *